United States Patent
Hosseini et al.

(10) Patent No.: US 12,035,353 B2
(45) Date of Patent: Jul. 9, 2024

(54) PRIORITIZATION TECHNIQUES FOR SIDELINK CHANNEL STATE INFORMATION REPORTING

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/352,637

(22) Filed: Jun. 21, 2021

(65) Prior Publication Data

US 2022/0408451 A1 Dec. 22, 2022

(51) Int. Cl.
*H04W 72/56* (2023.01)
*H04B 7/06* (2006.01)
*H04W 24/10* (2009.01)

(52) U.S. Cl.
CPC .......... *H04W 72/56* (2023.01); *H04B 7/0626* (2013.01); *H04W 24/10* (2013.01)

(58) Field of Classification Search
None
See application file for complete search history.

(56) References Cited

U.S. PATENT DOCUMENTS

| 2012/0196528 A1* | 8/2012 | Kazmi ................ H04W 52/46 455/9 |
| 2013/0212638 A1* | 8/2013 | Wilson ............... G06F 11/3688 726/1 |
| 2019/0222282 A1* | 7/2019 | Tsai .................... H04W 72/566 |
| 2023/0171623 A1* | 6/2023 | Zeineddine .......... H04W 24/10 370/252 |

FOREIGN PATENT DOCUMENTS

WO WO-2021214710 A1 * 10/2021

* cited by examiner

*Primary Examiner* — Chi H Pham
*Assistant Examiner* — Raul Rivas
(74) *Attorney, Agent, or Firm* — Holland & Hart LLP

(57) ABSTRACT

Methods, systems, and devices for wireless communications are described. In some systems, a user equipment (UE) may receive multiple requests for sidelink channel state information (CSI) and each request for sidelink CSI may trigger a different sidelink CSI report from the UE. The UE may assign a number of CSI processing units (CPUs) to each triggered sidelink CSI report and may select one or more of the triggered sidelink CSI reports for generation in accordance with a CPU capability of the UE and according to a priority associated with each of the requests. For example, the UE may select the one or more CSI reports in an order according to the priority and such that a summation of the CPUs assigned to each of the selected CSI reports avoids exceeding the CPU capability of the UE. The UE may generate and transmit the selected CSI reports.

26 Claims, 12 Drawing Sheets

PRIORITIZATION TECHNIQUES FOR SIDELINK CHANNEL STATE INFORMATION REPORTING

TECHNICAL FIELD

The following relates to wireless communications, including prioritization techniques for sidelink channel state information (CSI) reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, two wireless devices may communicate with each other in accordance with a quality of a communication channel between the two wireless devices. For example, one or both of the two wireless devices may configure one or more communication parameters based on the quality of the communication channel and may communicate in accordance with the configured communication parameters.

SUMMARY

The described techniques relate to improved methods, systems, devices, and apparatuses that support prioritization techniques for sidelink channel state information (CSI) reporting. Generally, the described techniques provide for a sidelink CSI reporting framework according to which a user equipment (UE) may selectively generate CSI reports in accordance with a CSI processing unit (CPU) assignment for the CSI reports and relative priorities of the CSI reports. For example, the UE may receive multiple requests for sidelink CSI, each request triggering a different CSI report, and the UE may select to generate one or more of the triggered CSI reports based on assigning a number of CPUs to each triggered CSI report and in accordance with a priority of each of the triggered CSI reports. The UE may assign each of the triggered CSI reports a number of CPUs based on a characteristic of that CSI report and the UE may feature an upper limit of CPUs that the UE is capable of handling (e.g., at a given time). As such, the UE may select triggered CSI reports for generation up to the CPU capability of the UE and may prioritize the triggered CSI reports according to their relative priorities.

A method for wireless communication at a UE is described. The method may include receiving a set of multiple requests for sidelink CSI, each request of the set of multiple requests triggering a different CSI report from the UE, generating one or more CSI reports responsive to the set of multiple requests in accordance with a CPU capability of the UE and a priority of each of the set of multiple requests, and transmitting the one or more CSI reports based on the priority of each of the set of multiple requests.

An apparatus for wireless communication at a UE is described. The apparatus may include at least one processor, memory coupled with the at least one processor, and instructions stored in the memory. The instructions may be executable by the at least one processor to cause the UE to receive a set of multiple requests for sidelink CSI, each request of the set of multiple requests triggering a different CSI report from the UE, generate one or more CSI reports responsive to the set of multiple requests in accordance with a CPU capability of the UE and a priority of each of the set of multiple requests, and transmit the one or more CSI reports based on the priority of each of the set of multiple requests.

Another apparatus for wireless communication at a UE is described. The apparatus may include means for receiving a set of multiple requests for sidelink CSI, each request of the set of multiple requests triggering a different CSI report from the UE, means for generating one or more CSI reports responsive to the set of multiple requests in accordance with a CPU capability of the UE and a priority of each of the set of multiple requests, and means for transmitting the one or more CSI reports based on the priority of each of the set of multiple requests.

A non-transitory computer-readable medium storing code for wireless communication at a UE is described. The code may include instructions executable by at least one processor to receive a set of multiple requests for sidelink CSI, each request of the set of multiple requests triggering a different CSI report from the UE, generate one or more CSI reports responsive to the set of multiple requests in accordance with a CPU capability of the UE and a priority of each of the set of multiple requests, and transmit the one or more CSI reports based on the priority of each of the set of multiple requests.

Some examples of the method, apparatuses, and non-transitory computer-readable medium described herein may further include operations, features, means, or instructions for assigning a number of CPUs to each CSI report triggered by the set of multiple requests in accordance with a characteristic of that CSI report, where generating the one or more CSI reports responsive to the set of multiple requests may be based on assigning the number of CPUs to each CSI report triggered by the set of multiple requests.

Some examples of the method, apparatuses, and non-transitory computer-readable medium described herein may further include operations, features, means, or instructions for selecting the one or more CSI reports based on the number of CPUs assigned to each of the one or more CSI reports and an order in which the set of multiple requests may be received, where the priority of each of the set of multiple requests may be based on the order in which the set of multiple requests may be received, and where the generating may be based on the selecting.

In some examples of the method, apparatuses, and non-transitory computer-readable medium described herein, the one or more CSI reports may be triggered by an earliest received one or more requests of the set of multiple requests relative to a remainder of the set of multiple requests.

Some examples of the method, apparatuses, and non-transitory computer-readable medium described herein may further include operations, features, means, or instructions for selecting the one or more CSI reports based on the number of CPUs assigned to each of the one or more CSI reports and whether the set of multiple requests may be associated with unicast reporting or groupcast reporting, where the priority of each of the set of multiple requests may be based on whether that request may be associated with the unicast reporting or the groupcast reporting, and where the generating may be based on the selecting.

Some examples of the method, apparatuses, and non-transitory computer-readable medium described herein may further include operations, features, means, or instructions for selecting the one or more CSI reports based on the number of CPUs assigned to each of the one or more CSI reports and a UE identifier associated with each of the set of multiple requests, where the priority of each of the set of multiple requests may be based on the UE identifier associated with each of the set of multiple requests, and where the generating may be based on the selecting.

Some examples of the method, apparatuses, and non-transitory computer-readable medium described herein may further include operations, features, means, or instructions for selecting the one or more CSI reports based on the number of CPUs assigned to each of the one or more CSI reports and a timer associated with each of the set of multiple requests, where the priority of each of the set of multiple requests may be based on the timer associated with each of the set of multiple requests, and where the generating may be based on the selecting.

In some examples of the method, apparatuses, and non-transitory computer-readable medium described herein, the one or more CSI reports may be triggered by one or more requests of the set of multiple requests that may be associated with timers that may be relatively closest to expiry relative to a remainder of the set of multiple requests.

Some examples of the method, apparatuses, and non-transitory computer-readable medium described herein may further include operations, features, means, or instructions for selecting the one or more CSI reports based on the number of CPUs assigned to each of the one or more CSI reports, whether the set of multiple requests may be associated with wideband reporting or subband reporting, and a number of CSI reference signal ports associated with each of the set of multiple requests, where the priority of each of the set of multiple requests may be based on whether that request may be associated with the wideband reporting or the subband reporting and the number of CSI reference signal ports associated with that request, and where the generating may be based on the selecting.

Some examples of the method, apparatuses, and non-transitory computer-readable medium described herein may further include operations, features, means, or instructions for selecting the one or more CSI reports based on the number of CPUs assigned to each of the one or more CSI reports and whether the set of multiple requests may be received from a base station or from one or more UEs, where the priority of each of the set of multiple requests may be based on whether that request may be received from the base station or from the one or more UEs, and where the generating may be based on the selecting.

In some examples of the method, apparatuses, and non-transitory computer-readable medium described herein, the characteristic of a CSI report may be based on a number of sidelink CSI reference signal ports associated with the CSI report, whether the CSI report may be for wideband reporting or for subband reporting, contents of the CSI report, a number of panels associated with the CSI report, or any combination thereof.

Some examples of the method, apparatuses, and non-transitory computer-readable medium described herein may further include operations, features, means, or instructions for receiving an indication of a prioritization rule for the set of multiple requests, where the priority of each of the set of multiple requests may be based on the indication of the prioritization rule.

Some examples of the method, apparatuses, and non-transitory computer-readable medium described herein may further include operations, features, means, or instructions for transmitting, to a base station or a second UE, control signaling including an indication of the CPU capability of the UE.

In some examples of the method, apparatuses, and non-transitory computer-readable medium described herein, receiving the set of multiple requests for sidelink CSI may include operations, features, means, or instructions for receiving a first request triggering a first CSI report, where the first CSI report may be assigned a first number of CPUs and the first request may be associated with a first priority and receiving, after the first request, a second request triggering a second CSI report, where the second CSI report may be assigned a second number of CPUs and the second request may be associated with a second priority greater than the first priority.

Some examples of the method, apparatuses, and non-transitory computer-readable medium described herein may further include operations, features, means, or instructions for determining that generating both the first CSI report and the second CSI report would exceed the CPU capability of the UE based on the first number of CPUs and the second number of CPUs, dropping the first CSI report based on the determining and based on the second priority being greater than the first priority, and selecting the second CSI report for generation based on dropping the first CSI report.

Some examples of the method, apparatuses, and non-transitory computer-readable medium described herein may further include operations, features, means, or instructions for deprioritizing a number of CSI reports in accordance with the CPU capability of the UE and the priority of each of the set of multiple requests, where the generated one or more CSI reports exclude the deprioritized number of CSI reports and refraining from transmitting the deprioritized number of CSI reports.

Some examples of the method, apparatuses, and non-transitory computer-readable medium described herein may further include operations, features, means, or instructions for assigning a number of CPUs to each of a first subset of CSI reports triggered by the set of multiple requests in accordance with a characteristic of that CSI report, where generating the one or more CSI reports responsive to the set of multiple requests may be based on assigning the number of CPUs to each of the first subset of CSI reports triggered by the set of multiple requests and starting a timer associated with each of a second subset of CSI reports triggered by the set of multiple requests in accordance with a latency bound parameter.

Some examples of the method, apparatuses, and non-transitory computer-readable medium described herein may further include operations, features, means, or instructions for generating a second one or more CSI reports from the second subset of CSI reports in accordance with the timer associated with each of the second subset of CSI reports and a sidelink resource allocation of the UE and transmitting the second one or more CSI reports as a result of the generating.

In some examples of the method, apparatuses, and non-transitory computer-readable medium described herein, a summation of a number of CPUs assigned to each of the one or more CSI reports may be less than or equal to the CPU capability of the UE.

DETAILED DESCRIPTION

Figure 1:
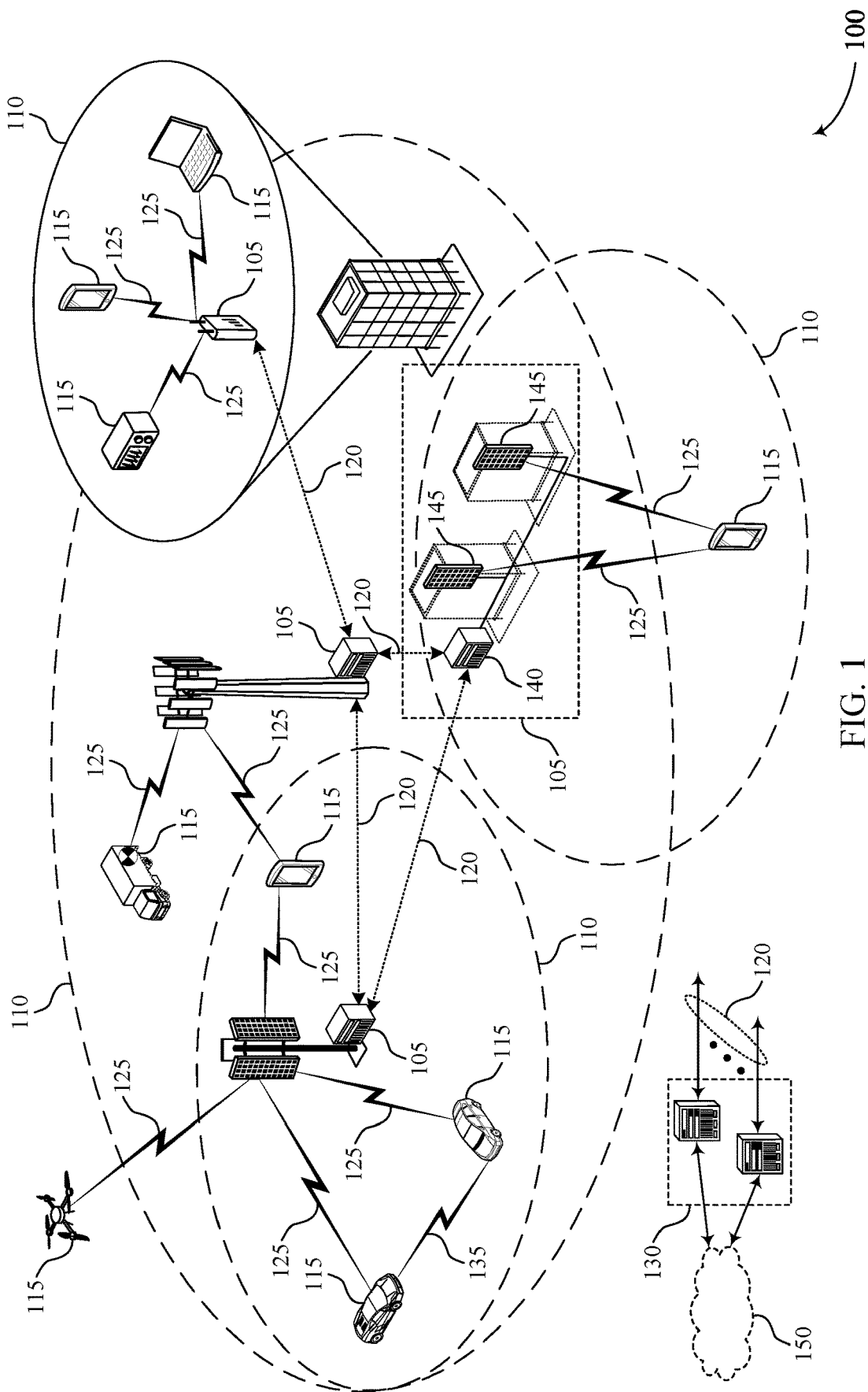
FIGS. 1 and 2 illustrate examples of wireless communications systems that support prioritization techniques for sidelink channel state information (CSI) reporting in accordance with aspects of the present disclosure.

In some wireless communications systems, a user equipment (UE) may communicate with one or more other UEs over one or more sidelink communication channels and, in some examples, the UEs may schedule communication or configure communication parameters in accordance with a quality of each of the one or more sidelink communication channels. To obtain information relating to a quality of a channel, a second UE may transmit a request for channel state information (CSI) to the UE and, as a result of receiving the request for the CSI, the UE may perform one or more channel measurements and generate a CSI report based on the one or more channel measurements. As such, the UE may receive requests for CSI from the one or more UEs with which it communicates, each request triggering generation of a different CSI report at the UE. In some cases, however, the UE may lack a configured rule or procedure for handling multiple requests for sidelink CSI. Such a lack of a configured rule or procedure may result in ambiguity between sidelink devices on how triggered CSI reports are prioritized, which may be detrimental in some applications (e.g., in industrial Internet of Things (IoT) or ultra-reliable low-latency communication (URLLC) applications).

In some implementations of the present disclosure, the UE may prioritize and generate triggered CSI reports according to a configured rule or procedure that is based on a CSI processing unit (CPU) capability of the UE. For example, the UE may feature a CPU capability that defines or is associated with how many CSI reports the UE is able to generate (e.g., at a given time) or how many CSI requests the UE is able to process in parallel at a given time. For example, the CPU capability of the UE may be associated with a number of simultaneous CSI processes that the UE is capable of performing. In some implementations, the UE may assign each triggered CSI report a number of CPUs and may select one or more of the triggered CSI reports for generation such that the selected CSI reports avoid exceeding the CPU processing unit capability of the UE. In other words, the UE may select to generate one or more CSI reports such that a total number of CPUs of the selected CSI reports is less than or equal to the CPU capability of the UE. Further, the UE may select CSI reports for generation (up to the CPU capability of the UE) in accordance with a priority associated with each request. As such, the UE may select CSI reports for generation in an order based on the relative priorities associated with each request until a next CSI report would exceed the CPU capability of the UE.

Particular aspects of the subject matter described in this disclosure can be implemented to realize one or more of the following potential advantages. For example, the described techniques may be implemented to support a configured rule or procedure according to which the UE may generate one or more sidelink CSI reports responsive to receiving multiple requests for sidelink CSI, which may provide greater system control over sidelink CSI reporting and reduce ambiguity within the system as to how UEs handle multiple requests for sidelink CSI. Further, as a result of employing a prioritization rule for selecting CSI reports for generation (within the capability of the UE), the UE may provide accurate CSI in a timely manner for relatively higher priority communication channels or in response to relatively higher priority triggering requests. In some examples, such accurate and timely CSI reporting in accordance with the prioritization rule and the capability of the UE may enable the UE to provide more information relating to a quality of one or more sidelink channels, which may support the use of more appropriate communication parameters or improved scheduling decisions. Further, as a result of communicating using more appropriate communication parameters or in accordance with scheduling decisions that more fully account for relevant CSI, the UE may experience a greater likelihood for successful communication, which may result in higher data rates, greater spectral efficiency, and increased system throughput.

Aspects of the disclosure are initially described in the context of wireless communications systems. Additionally, aspects of the disclosure are illustrated by and described with reference to a control message and a process flow. Aspects of the disclosure are further illustrated by and described with reference to apparatus diagrams, system diagrams, and flowcharts that relate to prioritization techniques for sidelink CSI reporting.

FIG. 1 illustrates an example of a wireless communications system 100 that supports prioritization techniques for sidelink CSI reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Components within a wireless communication system may be coupled (for example, operatively, communicatively, functionally, electronically, and/or electrically) to each other.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may communicate with one or more other UEs 115 via one or more sidelink channels and the UE 115 may provide information relating to a quality of the one or more sidelink channels periodically or aperiodically (e.g., upon request). For example, the UE 115 may receive multiple requests for sidelink CSI and each request may trigger a different CSI report from the UE 115. The UE 115 may receive the multiple requests for sidelink CSI from one or more base stations 105 or one or more other UEs 115, or any combination thereof.

In some implementations, the UE 115 may assign a number of (e.g., one or more) CPUs to each of the triggered CSI reports and may select one or more of the triggered CSI reports for generation based on the CPU assignments, a prioritization rule, and a capability of the UE 115 (e.g., a CPU capability). For example, the UE 115 may select to generate the one or more triggered CSI reports as a result of such triggered CSI reports being associated with relatively higher priority requests and such that the selected CSI reports are collectively associated with a total number of CPUs that is less than or equal to the CPU capability of the UE 115. The UE 115 may generate the one or more CSI reports and may transmit the generated CSI reports to corresponding (e.g., requesting) devices.

Figure 2:
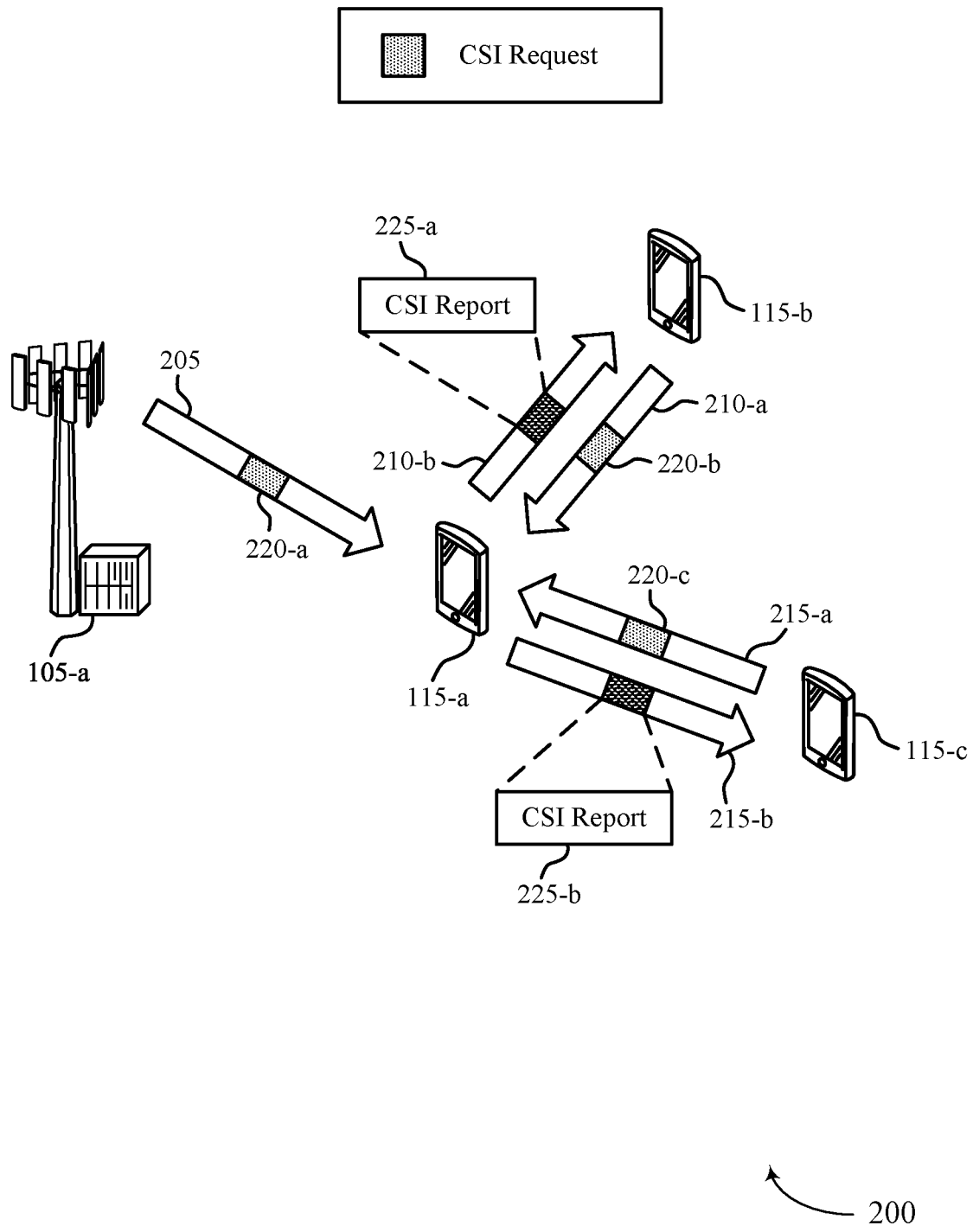

FIG. 2 illustrates an example of a wireless communications system 200 that supports prioritization techniques for sidelink CSI reporting in accordance with aspects of the present disclosure. The wireless communications system 200 may implement or be implemented to realize aspects of the wireless communications system 100. For example, the wireless communications system 200 may include a UE 115-a, a UE 115-b, a UE 115-c, and a base station 105-a, which may be examples of corresponding devices described herein, including with reference to FIG. 1. In some examples, the UE 115-a may receive multiple requests for sidelink CSI, each request triggering a different CSI report from the UE 115-a. The UE 115-a may generate one or more CSI reports 225 responsive to the multiple requests in accordance with a CPU capability of the UE 115-a and according to a priority of each of the multiple requests.

For example, the UE 115-a may communicate with one or more other UEs 115, including the UE 115-b and the UE 115-c, via one or more sidelink communication channels. The UE 115-a may communicate with the UE 115-b via a communication link 210 (which may be an example of a sidelink or a sidelink communication channel), shown as a communication link 210-a for communication from the UE 115-b to the UE 115-a and a communication link 210-b for communication from the UE 115-a to the UE 115-b. Similarly, the UE 115-a may also communicate with the UE 115-c via a communication link 215 (which may be an example of a sidelink or a sidelink communication channel), shown as a communication link 215-a for communication from the UE 115-c to the UE 115-a and as a communication link 215-b for communication from the UE 115-a to the UE 115-c. The UE 115-a may also communicate with the base station 105-a via a communication link 205.

The UE 115-a, the UE 115-b, and the UE 115-c may be examples of any peer devices capable of communicating with each other via a sidelink. In some examples, for instance, the UE 115-a, the UE 115-b, and the UE 115-c may communicate within a V2X network. Within some networks (e.g., such as within a V2X network), the various UEs 115 may support aperiodic CSI for unicast transmissions. For example, the various UEs 115 may transmit or receive one or more CSI-RSs over a sidelink channel, such as a physical sidelink shared channel (PSSCH). To control such a sidelink CSI reporting procedure, the various UEs 115 may receive control signaling (e.g., RRC signaling) configuring one or more parameters according to which a reporting UE 115 (e.g., the UE 115-a) may transmit a CSI report 225. For example, the various UEs 115 may receive RRC signaling configuring a sl-LatencyBound-CSI-Report parameter that is maintained for each PC5-RRC connection.

The sidelink CSI reporting procedure may vary depending on whether a reporting UE 115 (e.g., the UE 115-a) is operating in accordance with a sidelink mode 1 or a sidelink mode 2. In examples in which the reporting UE 115 operates in accordance with the sidelink mode 1 (e.g., in which UEs 115 may receive scheduling information and resource allocations from the base station 105-a), if the reporting UE 115 is requested to report CSI to a sidelink triggering UE (e.g., the UE 115-b or the UE 115-c) but does not have a sidelink resource allocation, the reporting UE 115 may transmit a scheduling request to the base station 105-a requesting resources for a CSI report 225. Alternatively, in examples in which the reporting UE 115 operates in accordance with the sidelink mode 2 (e.g., in which UEs 115 may make scheduling decisions and autonomously select resources over which to transmit), if the reporting UE 115 is unable to find a PSSCH resource for transmission of a CSI report 225 before expiration of a timer indicated by the latency bound parameter (e.g., the sl-LatencyBound-CSI-Report parameter), the reporting UE 115 may refrain from reporting the CSI.

To support and maintain a sufficient link quality, however, the reporting UE 115 and the transmitting UE 115 (e.g., the triggering or requesting UE 115) may rely on accurate CSI acquisition in a timely (e.g., low-latency) manner. Further, in some applications, such as in URLLC or industrial IoT applications, accurate and timely CSI may be especially helpful for link maintenance. Further, how a UE 115 obtains and reports CSI may vary on a device-level basis. For example, for the purpose of power saving, some sidelink UEs 115 may refrain from performing sensing and resource reservation associated with obtaining CSI and instead may rely on another UE 115 (e.g., a relay UE 115) to allocate resources for them. Accordingly, such UEs 115 may perform one or more channel measurements over the allocated resources and transmit a CSI report 225 based on the channel measurements.

In some examples, the various sidelink UEs 115 may feature or support a mapping between CSI-RS triggering and the resources over which CSI is reported. In other words, for example, the mapping may indicate a correspondence between a first resource over which a CSI-RS is measured or over which a request for CSI is received and a second resource over which a reporting UE 115 may transmit a corresponding CSI report 225. Accordingly, the reporting UE 115 may report CSI at a specified time (e.g., during a specified set of symbol periods or during a specified slot).

In some cases, however, the reporting UE 115 may receive multiple requests for sidelink CSI, each request triggering a different CSI report 225, and the reporting UE 115 may lack a configured rule or procedure according to which the UE 115 may respond to the multiple different requests. Without such a configured rule or procedure, the reporting UE 115 may be unable to reliably prioritize CSI reports 225 in accordance with network conditions or parameters and ambiguity may arise between UEs 115, as different UEs 115 may implement different techniques for handling multiple requests for CSI.

For example, and as shown in FIG. 2, the UE 115-a may receive multiple CSI requests 220 (e.g., requests for sidelink CSI), each of the multiple CSI requests 220 triggering a different CSI report 225 from the UE 115-a. For instance, the UE 115-a may receive a CSI request 220-a from the base station 105-a, a CSI request 220-b from the UE 115-b, and a CSI request 220-c from the UE 115-c and each of the CSI request 220-a, the CSI request 220-b, and the CSI request 220-c may trigger a different CSI report 225 from the UE 115-a.

In some implementations, the UE 115-a may generate one or more CSI reports 225 responsive to the multiple CSI requests 220 in accordance with a CPU capability of the UE 115-a and based on a priority associated with each of the CSI requests 220. In some examples, for instance, the network (e.g., or a specification) may define a sidelink CPU for sidelink CSI reporting and the UE 115-a may use a sidelink CPU-based rule or procedure for selecting CSI reports 225 for CSI report generation responsive to receiving multiple CSI requests 220. For example, the UE 115-a may feature a capability or upper limit for CSI reporting that is maintained or tracked in terms of (e.g., on a basis of) CPUs and CSI reports 225 may occupy a number of CPUs. As such, the UE 115-a may select CSI reports 225 for generation such that the selected CSI reports 225 are associated with a total number of CPUs that is less than or equal to the capability or upper limit of the UE 115-*a*.

For example, if the UE 115-*a* has a CPU capability of 5 CPUs and is triggered for a first CSI report 225 occupying 3 CPUs, a second CSI report 225 occupying 2 CPUs, and a third CSI report 225 occupying 3 CPUs, and if the UE 115-*a* selects to generate the first CSI report 225 and the second CSI report 225, the UE 115-*a* may refrain from also generating (e.g., updating) the third CSI report 225 as the third CSI report 225 would result in a violation of the CPU capability of the UE 115-*a*. In other words, generating the third CSI report 225 may violate a rule that is based on the CPU capability of the UE 115-*a*, where such a rule may define an upper limit of CPUs that the UE 115-*a* is able to handle in CSI report generation. In some implementations, the UE 115-*a* may still transmit the third CSI report 225, but may refrain from updating or performing any new measurements associated with the third CSI report 225. In some aspects, the UE 115-*a* may transmit an indication of the CPU capability of the UE 115-*a* to one or more of the base station 105-*a*, the UE 115-*b*, or the UE 115-*c*. For example, sidelink UEs 115 supporting such a CPU-based CSI reporting procedure may exchange signaling indicating respective CPU capabilities, which may support greater system coordination and knowledge.

A CSI report 225 may occupy one or more CPUs. In some examples, the number or quantity of CPUs that a CSI report 225 occupies or is associated with may vary based on one or more characteristics of the CSI report 225. For example, a CSI report 225 may occupy a number of CPUs depending on a number of associated sidelink CSI-RS ports, whether the CSI report 225 is for subband reporting or wideband reporting, a content of the CSI report 225, a number of panels (e.g., antenna panels) associated with the CSI report 225, or any other characteristic of the CSI report 225, or any combination thereof. In some aspects, the content of the CSI report 225 may be based on a rank indication (RI), a channel quality indicator (CQI), or a precoding matrix indicator (PMI), or any combination thereof, that may be included in the CSI report 225. Accordingly, the UE 115-*a* may assign a number of CPUs to each triggered CSI report 225 based on any one or more of such characteristics.

Further, in some implementations, the UE 115-*a* may select CSI reports 225 for generation according to a prioritization rule (which may be equivalently referred to herein as a priority rule). In other words, CPU occupancy or prioritization (toward the capability or upper limit of the UE 115-*a*) may be done based on the prioritization rule (e.g., the priority rule). In some examples, the prioritization rule may be associated with or defined by an order in which CSI requests 220 are received. For example, the UE 115-*a* may select CSI reports 225 for generation according to an order in which sidelink CSI reporting is triggered at the UE 115-*a* (e.g., for either periodic or aperiodic sidelink CSI reporting). Such "first-in first-out" sidelink CSI reporting may feature similarities to Uu CSI reporting, but sidelink CSI reporting based on the order in which CSI reports are triggered may be implemented in scenarios in which multiple requests for CSI are triggered by a single UE 115. For example, the UE 115-*a* may prioritize CSI reports 225 in accordance with the order in which corresponding requests for CSI are received if the CSI reports 225 are triggered by a single UE 115 (e.g., and not if the CSI reports 225 are triggered by different UEs 115). In other words, for a given UE identifier, the manner in which the UE 115-*a* selects or determines CPU occupancy or prioritization may be based on the order of triggering.

Further, although such implementations involve selecting CSI reports 225 for generation according to the order in which corresponding requests for sidelink CSI are received if the requests are received from a single UE 115, the UE 115-*a* may also select CSI reports 225 for generation according to the order in which corresponding requests for sidelink CSI are received even if the requests are received from multiple different UEs 115 (or, additionally or alternatively, from one or more base stations 105) without exceeding the scope of the present disclosure.

Additionally or alternatively, the prioritization rule for sidelink CSI reporting may be defined in accordance with one or more features or characteristics associated with the CSI requests 220. In some examples, for instance, the prioritization rule may be cast-type dependent such that requests triggering sidelink CSI reporting for unicast may have a different priority than requests triggering sidelink CSI reporting for groupcast (e.g., connection-based, managed groupcast) or multicast. Such a prioritization rule may be implemented if the UE 115-*a* supports, in addition to unicast, groupcast sidelink CSI reporting. In some examples, CSI requests 220 associated with unicast CSI reporting may have a higher priority than CSI requests 220 associated with groupcast CSI reporting, while in some other examples CSI requests 220 associated with groupcast CSI reporting may have a higher priority than CSI requests 220 associated with unicast CSI reporting.

Additionally or alternatively, the prioritization rule may be based on a UE identifier. For example, CSI reporting for some users (e.g., such as a UE 115 acting as a relay) may have a higher priority than some other users. As such, the UE 115-*a* may prioritize CSI reports 225 responsive to CSI requests 220 from relatively higher priority users over CSI reports 225 responsive to CSI requests 220 from relatively lower priority users. Additionally or alternatively, the prioritization rule may be based on a timer associated with a CSI request 220. For example, each CSI request 220 may be associated with a timer defined by a sl-LatencyBound-CSI-Report parameter and the UE 115-*a* may prioritize CSI reports 225 responsive to CSI requests 220 that are associated with timers that are relatively closest to expiry relative to other CSI requests. In other words, the prioritization rule may be based on the remaining time as defined by the sl-LatencyBound-CSI-Report parameter and CSI reports 225 that are requested to be updated and are closer to a deadline (e.g., a deadline as defined by the sl-Latency-Bound-CSI-Report parameter) may be prioritized.

Additionally or alternatively, the prioritization rule may be defined based on whether CSI requests 220 request subband CSI reporting or wideband CSI reporting, a number of CSI-RS ports associated with the CSI requests 220, or a CSI report content requested by the CSI requests 220, or any combination thereof. For example, CSI requests 220 associated with subband CSI reporting may be associated with a relatively higher priority than CSI requests 220 associated with wideband CSI reporting or, alternatively, CSI requests 220 associated with wideband CSI reporting may be associated with a relatively higher priority than CSI requests 220 associated with subband CSI reporting. Similarly, CSI requests 220 may be associated with relatively higher or lower priorities based on a number of CSI-RS ports associated with each of the CSI requests 220 or a requested content associated with each of the CSI requests 220.

Additionally or alternatively, the prioritization rule may be based on whether the requests for sidelink CSI are received from another sidelink UE 115 (e.g., the UE 115-*b* or the UE 115-*c*) or from a base station 105 (e.g., the base station 105-a). For example, the UE 115-a may support (e.g., be capable of supporting, in line with the capability of the UE 115-a) a number of CPUs across various (e.g., all) carriers. As such, a first carrier or resource pool may be configured for sidelink mode 1 and, for the first carrier or resource pool, the base station 105-a may trigger a sidelink CSI report 225. A second carrier or resource pool may be configured for sidelink mode 2 and, for the second carrier or resource pool, another sidelink UE 115 (e.g., the UE 115-b or the UE 115-c) may trigger a sidelink CSI report 225. Accordingly, the UE 115-b may receive CSI requests 220 from both UEs 115 and the base station 105-a triggering sidelink CSI reporting and the UE 115-b may prioritize requests based on whether the request was sent from the base station 105-a or from another UE 115. In some examples, CSI requests 220 received from another sidelink UE 115 may have a relatively higher priority than CSI requests 220 received from the base station 105-a, while in some other examples CSI requests 220 received from the base station 105-a may have a relatively higher priority than CSI requests 220 received from another sidelink UE 115.

Additionally or alternatively, the prioritization rule may be based on whether the CSI requests are aperiodic or periodic. In some examples, for instance, the UE 115-a may prioritize aperiodic CSI requests 220 over periodic CSI requests 220. Alternatively, in some other examples, the UE 115-a may prioritize periodic CSI requests 220 over aperiodic CSI requests 220. Further, the prioritization rule may be indicated implicitly or explicitly. For example, for aperiodic CSI, the trigger (e.g., the CSI request 220) may indicate the priority. Additionally or alternatively, for periodic CSI, the priority may be set by higher layer signaling (e.g., PC5 RRC signaling) as part of configuration or may be indicated in sidelink control information (SCI) (e.g., an activating SCI).

As such, the UE 115-a may select one or more CSI reports 225 for generation responsive to the multiple CSI requests 220 according to the prioritization rule and such that the selected CSI reports 225 occupy a number of CPUs that is less than or equal to the capability or upper limit of the UE 115-a. Further, the UE 115-a may receive CSI requests 220 over time such that, in some examples, the UE 115-a may receive a relatively higher priority CSI request 220 at a later point in time than a relatively lower priority CSI request 220. In such examples, if the UE 115-a has previously selected to generate a CSI report 225 responsive to the relatively lower priority CSI request 220 and if the UE 115-a does not have a sufficient CPU capability to additionally generate a CSI report 225 responsive to the relatively higher priority CSI request 220 (e.g., if a number of remaining available CPUs of the UE 115-a is not enough), the UE 115-a may prioritize the later, higher priority CSI request 220 over the earlier, lower priority CSI request 220. As such, the UE 115-a may deprioritize a CSI report 225 corresponding to the lower priority CSI request 220 and prioritize a CSI report 225 corresponding to the higher priority CSI request 220. Accordingly, the UE 115-a may release the earlier triggered, deprioritized report.

Further, if a CSI report 225 is deprioritized (e.g., as a result of receiving a higher priority CSI request 220), the UE 115-a may refrain from reporting stale CSI. For example, as a result of deprioritizing a CSI report 225, the UE 115-a may refrain from performing any channel measurements associated with generating a fresh CSI report 225 and may also refrain from reporting previously measured, outdated CSI. In some examples, the UE 115-a may implement such a technique for refraining from reporting stale or outdated sidelink CSI to reduce the likelihood for collisions over sidelink resources. For example, while some Uu CSI reporting procedures may still include reporting of stale CSI, the UE 115-a may refrain from reporting stale CSI if the request for CSI is associated with sidelink CSI.

In some implementations, the UE 115-a may implement the described CPU-based rule or procedure for selectively generating CSI reports 225 responsive to a first set of one or more CSI request 220 and may implement a different reporting mechanism for generating CSI reports 225 responsive to a second set of one or more CSI requests 220. For example, the UE 115-a may be enabled or configured to implement different reporting mechanisms for different sets of CSI requests 220. In some examples, for instance, the UE 115-a may implement a CPU-based rule or procedure for some CSI requests 220 and may generate CSI reports 225 responsive to other CSI requests 220 using a non-CPU-based rule or procedure. In some examples, such a non-CPU-based rule or procedure may include generating CSI reports 225 responsive to the other CSI requests 220 in accordance with timers defined based on the sl-Latency-Bound-CSI-Report parameter and UE implementation or decision (e.g., without a configured rule or procedure according to which the UE 115-a may select CSI reports 225 for generation).

In such examples in which the UE 115-a implements a CPU-based rule or procedure for the first set of CSI requests 220 and a UE decision-based approach or a non-CPU-based rule or procedure for the second set of CSI requests 220, the UE 115-a may refrain from assigning any CPUs to CSI reports 225 corresponding to the second set of CSI requests while still assigning CPUs for CSI reports 225 corresponding to the first set of CSI requests. For example, under such a UE decision-based approach in accordance with timers defined based on the sl-LatencyBound-CSI-Report parameter, a specific resource for CSI reporting is not configured or indicated and the UE 115-a may delay a CSI report 225 for as long as the CSI delay budget (e.g., the sl-Latency-Bound-CSI-Report parameter) allows.

As such, the UE 115-a may selectively generate one or more CSI reports 225 responsive to multiple CSI requests 220 in an organized and reliable manner, which may improve system coordination and reduce latency for relatively higher priority CSI reporting. For example, the described techniques may be useful for supporting sidelink consumer use cases and industrial IoT applications, especially those associated with relatively strict URLLC constraints. As shown in FIG. 2, the UE 115-a may select to generate and transmit a CSI report 225-a responsive to the CSI request 220-b received from the UE 115-b and may select to generate and transmit a CSI report 225-b responsive to the CSI request 220-c from the UE 115-c. According to the implementations described herein, the UE 115-a may select the CSI report 225-a and the CSI report 225-b for generation as a result of the CSI request 220-b and the CSI request 220-c being relatively higher priority CSI requests (e.g., relatively higher priority than the CSI request 220-a received from the base station 105-a) and as a result of the CSI report 225-a and the CSI report 225-b occupying a number of CPUs that is less than or equal to the CPU capability of the UE 115-a.

Further, although shown as generating two CSI reports 225 responsive to three CSI requests 220, the UE 115-a may generate any number of CSI reports 225 responsive to any number of CSI requests 220 without exceeding the scope of the present disclosure. Similarly, although shown as each transmitting a single request for sidelink CSI, one or more of the UE 115-b, the UE 115-c, or the base station 105-a may transmit multiple requests for sidelink CSI to the UE 115-*a* without exceeding the scope of the present disclosure. Various additional details relating to CSI calculation and reporting are described in more detail herein, including with reference to FIG. 3.

Figure 3:
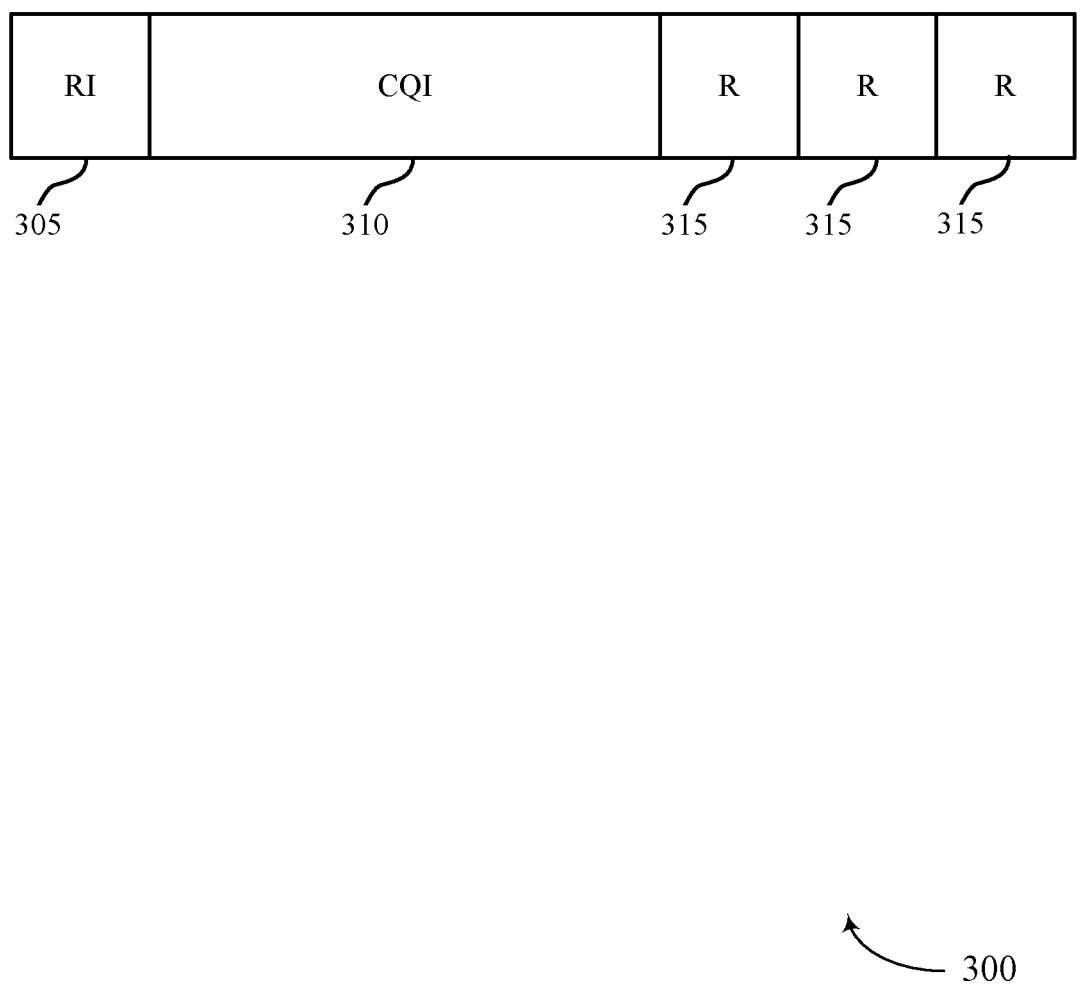
FIG. 3 illustrates an example of a control message that supports prioritization techniques for sidelink CSI reporting in accordance with aspects of the present disclosure.

FIG. 3 illustrates an example of a control message 300 that supports prioritization techniques for sidelink CSI reporting in accordance with aspects of the present disclosure. The control message 300 may be implemented to realize aspects of the wireless communications system 100 or the wireless communications system 200. For example, the control message 300 may be transmitted by a UE 115 to another UE 115 or to a base station 105, which may be examples of corresponding devices described herein, including with reference to FIGS. 1 and 2. In some examples, the control message 300 may be an example of a MAC control element (MAC-CE) carrying sidelink CSI.

For example, a UE 115 may transmit a CSI report in the control message 300 (e.g., a MAC-CE or another CSI reporting control message). The CSI reporting MAC-CE may be identified by a MAC sub-header with a logical channel identifier (LCID) for sidelink CSI reporting (as specified in a specification). The priority of a sidelink CSI reporting MAC-CE may be indicated by a fixed value (e.g., fixed to 1). The sidelink CSI reporting MAC-CE may include a field 305, a field 310, and one or more fields 315. The field 305 may be an RI field and may indicate a derived value of the rank indicator for sidelink CSI reporting. In some examples, the field 305 may have a length of one bit. The field 310 may be a CQI field. The field 310 may indicate a derived value of the CQI for sidelink CSI reporting and, in some examples, the length of the field 310 may be 4 bits. The MAC-CE may also include the one or more fields 315 with reserved bits (e.g., set to zero). In some examples, the UE 115 may perform a triggered CSI estimation, and may identify a data transmission in which to include the control message 300, including the CSI report.

In some examples, a UE 115 may transmit, to a base station 105, or another UE 115, a CSI report using the control message 300, as described in greater detail with reference to FIG. 2. Transmitting such sidelink CSI reports may be based on CSI estimation that is based at least in part on a CPU capability of a UE 115 and a prioritization rule, as described herein, including with reference to FIG. 2.

In some cases, a UE 115 may communicate with a base station 105 via a Uu link and may communicate with another UE 115 via a sidelink. In some cases, the UE 115 may perform CSI estimation for the Uu link and may also support CSI reporting for the sidelink. The UE 115 may transmit sidelink CSI-RSs (e.g., which may be referred to as SL CSI-RS, or a SL-RS) within a unicast PSSCH if one or more conditions are satisfied. For example, the UE 115 may transmit the sidelink CSI-RS within the PSSCH transmission if CSI reporting is enabled by higher layer signaling (e.g., via a sl-CSI-Acquisition parameter), if a CSI request field in a corresponding SCI format (e.g., SCI format 0-2) is set to a specific value (e.g., 1), or both. For CSI-RS transmissions, one or more parameters may be configured by higher layer signaling. For example, a first parameter (e.g., nrofPortsCSIRS-SL) may indicate a number of ports for the SL CSI-RS, a second parameter (e.g., fir stSymbolInTimeDomainCSIRS-SL) may indicate a first OFDM symbol in a physical resource block (PRB) used for sidelink CSI-RS, and a third parameter (e.g., frequDomainAllocationCSIRS-SL) may indicate the frequency domain allocation for SL CSI-RS. The UE 115 may transmit CSI reports to the base station 105 or the other UE 115, and each CSI report may include a CQI, an RI, or any combination thereof. The CQI and the RI may be reported together.

The UE 115 may calculate CSI parameters (e.g., if reported) assuming one or more dependencies between CSI parameters (e.g., the CQI may be calculated or conditioned on reported RI). In some examples, CSI reporting may be aperiodic. In some examples, a CSI-RS configuration (e.g., an aperiodic CSI-RS) may be triggered by SCI. In some examples, a wireless communications system may support wideband CQI reporting for CSI reporting. Wideband CQI may be reported (e.g., for each codeword), for an entire CSI reporting band, which may be limited to the PSSCH transmission band. Sidelink CSI reports may be carried in a MAC-CE.

In some examples, a CSI-triggering UE 115 may not support triggering of another aperiodic CSI report for a same UE 115 before a last slot of the expected reception or completion of an ongoing CSI report associated with the SCI format 2-A with the CSI request field set to 1. For example, if a first UE 115 triggers a CSI estimation for a second UE 115, the first UE 115 may not trigger a second CSI estimation for the second UE 115 until a last slot of an expected CSI report, until a CSI estimation and reporting procedure is complete, or until a final slot of an expected CSI report plus a fixed delay. The first UE 115 may request other CSI estimations and CSI reports from other UEs 115 while one UE 115 is performing a CSI estimation procedure.

In some examples, a UE 115 may receive a trigger to perform a CSI estimation procedure. The UE 115 may measure CSI, but may not be configured with a specific time to report the CSI. The UE 115 may identify existing resources for reporting CSI (e.g., may include the CSI report in a MAC-CE, which may be included in a data message on the PSSCH). If the UE 115 cannot identify or does not have any available resources in which to transmit the CSI report (e.g., within a threshold amount of time), the UE 115 may drop the CSI report and refrain from transmitting a CSI report. Thus, the UE 115 may cancel a triggered SL-CSI reporting if, for each pair of source layer 2 identifier and destination layer 2 identifiers corresponding to a PC5-RRC connection which has been established by upper layers, the SL-CSI reporting has been triggered by an SCI and not canceled, and if the latency constraint of the SL-CSI reporting in sl-LatencyBound-CSI-Report cannot be met (e.g., too much time has passed without the UE 115 identifying resources over which to transmit the CSI report). Or, if a MAC entity has sidelink resources allocated for new transmission and the sidelink shared channel resources can accommodate the sidelink CSI reporting MAC-CE and its sub-header as a result of logical channel prioritization, the UE 115 may instruct the multiplexing and assembly procedure to generate a sidelink CSI reporting MAC-CE, or cancel the triggered sidelink CSI reporting. Or, if the MAC entity has been configured with sidelink resource allocation in a first mode (e.g., a sidelink communication mode 1), then the UE 115 may trigger a scheduling request (e.g., for the CSI report). A MAC entity of the UE 115 may be configured with sidelink resource allocation mode 1, and may trigger a scheduling request if transmission of a pending SL-CSI reporting with the sidelink grant cannot fulfil the latency constraint associated with the SL-CSI reporting.

Figure 4:
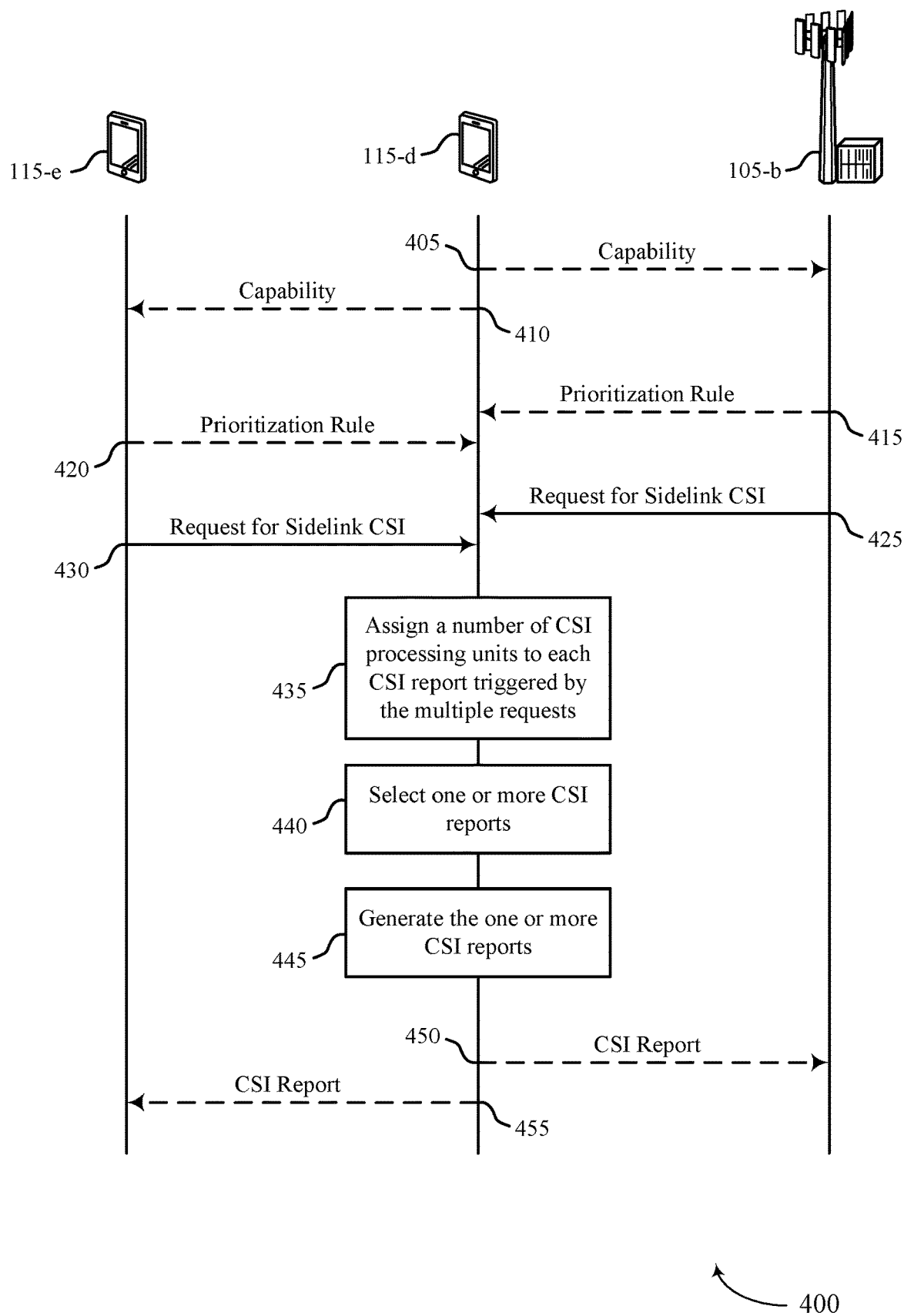
FIG. 4 illustrates an example of a process flow that supports prioritization techniques for sidelink CSI reporting in accordance with aspects of the present disclosure.

FIG. 4 illustrates an example of a process flow 400 that supports prioritization techniques for sidelink CSI reporting in accordance with aspects of the present disclosure. The process flow 400 may implement or be implemented to realize aspects of the wireless communications system 100 or the wireless communications system 200. For example, the process flow 400 may illustrate communication between a UE 115-*d*, a UE 115-*e*, and a base station 105-*b*, which may be examples of corresponding devices described herein, including with reference to FIGS. 1 and 2. In some examples, the UE 115-*d* may receive multiple requests for sidelink CSI and may generate one or more CSI reports responsive to the multiple requests for sidelink CSI in accordance with a CPU capability of the UE 115-*d* and according to a priority associated with each of the multiple requests.

In the following description of the process flow 400, the operations may be performed (e.g., reported or provided) in a different order than the order shown, or the operations performed by the example devices may be performed in different orders or at different times. For example, specific operations may also be left out of the process flow 400, or other operations may be added to the process flow 400. Further, although some operations or signaling may be shown to occur at different times for discussion purposes, these operations may actually occur at the same time.

At 405, the UE 115-*d* may, in some implementations, transmit control signaling including an indication of the CPU capability of the UE 115-*d* to the base station 105-*b*. Similarly, at 410, the UE 115-*d* may, in some implementations, transmit control signaling including an indication of the CPU capability of the UE 115-*d* to the UE 115-*e*. For example, various devices, including sidelink devices, may exchange respective CPU capabilities for reporting sidelink CSI. As such, the various devices may support greater system coordination and knowledge.

At 415, the UE 115-*d* may, in some implementations, receive an indication of a prioritization rule for CSI requests from the base station 105-*b*. Additionally or alternatively, at 420, the UE 115-*d* may, in some implementations, receive the indication of the prioritization rule for CSI requests from the UE 115-*e*. In some examples, a priority of each of the multiple requests for sidelink CSI that the UE 115-*d* may receive is based on the indication of the prioritization rule. Additional details relating to the prioritization rule are described herein, including with reference to FIG. 2.

At 425, the UE 115-*d* may receive a request for sidelink CSI from the base station 105-*b*. Additionally or alternatively, at 430, the UE 115-*d* may receive a request for sidelink CSI from the UE 115-*e*. Further, in some implementations, one or both of the UE 115-*e* or the base station 105-*b* may transmit multiple requests for sidelink CSI. In some examples, each request for sidelink CSI may trigger a different CSI report from the UE 115-*d*.

At 435, the UE 115-*d* may assign a number of CPUs to each CSI report triggered by the multiple requests in accordance with a characteristic of that CSI report. Such a characteristic of a CSI report may include or be based on a number of CSI-RS ports associated with the CSI report, whether the CSI report is for wideband reporting or for subband reporting, content of the CSI report, a number of panels associated with the CSI report, or any combination thereof.

At 440, the UE 115-*d* may select one or more CSI reports for generation based on assigning each triggered CSI report a number of CPUs, in accordance with the CPU capability of the UE 115-*d*, and the priority of each of the multiple requests for sidelink CSI. Additional details relating to such a selecting of CSI reports for generation based on assigned CPUs and relative priorities are described herein, including with reference to FIG. 2.

At 445, the UE 115-*d* may generate the one or more CSI reports responsive to the multiple requests in accordance with the CPU capability of the UE 115-*d* and the priority of each of the multiple requests (e.g., based on the selecting at 440). Additional details relating to such selective generation of CSI reports for based on assigned CPUs and relative priorities are described herein, including with reference to FIG. 2.

At 450, the UE 115-*d* may, in some implementations, transmit a CSI report to the base station 105-*b* as a result of the generating and based on the priority of each of the multiple requests. For example, the UE 115-*d* may select to generate the CSI report for the base station 105-*b* if the request received from the base station 105-*b* is associated with a relatively higher priority and if CPUs assigned to that CSI report are within the CPU capability of the UE 115-*d* (e.g., after considering or adding CPUs assigned to any other selected CSI reports).

Additionally or alternatively, at 455, the UE 115-*d* may, in some implementations, transmit a CSI report to the UE 115-*e* as a result of the generating and based on the priority of each of the multiple requests. For example, the UE 115-*d* may select to generate the CSI report for the UE 115-*e* if the request received from the UE 115-*e* is associated with a relatively higher priority and if CPUs assigned to that CSI report are within the CPU capability of the UE 115-*d* (e.g., after considering or adding CPUs assigned to any other selected CSI reports).

Figure 5:
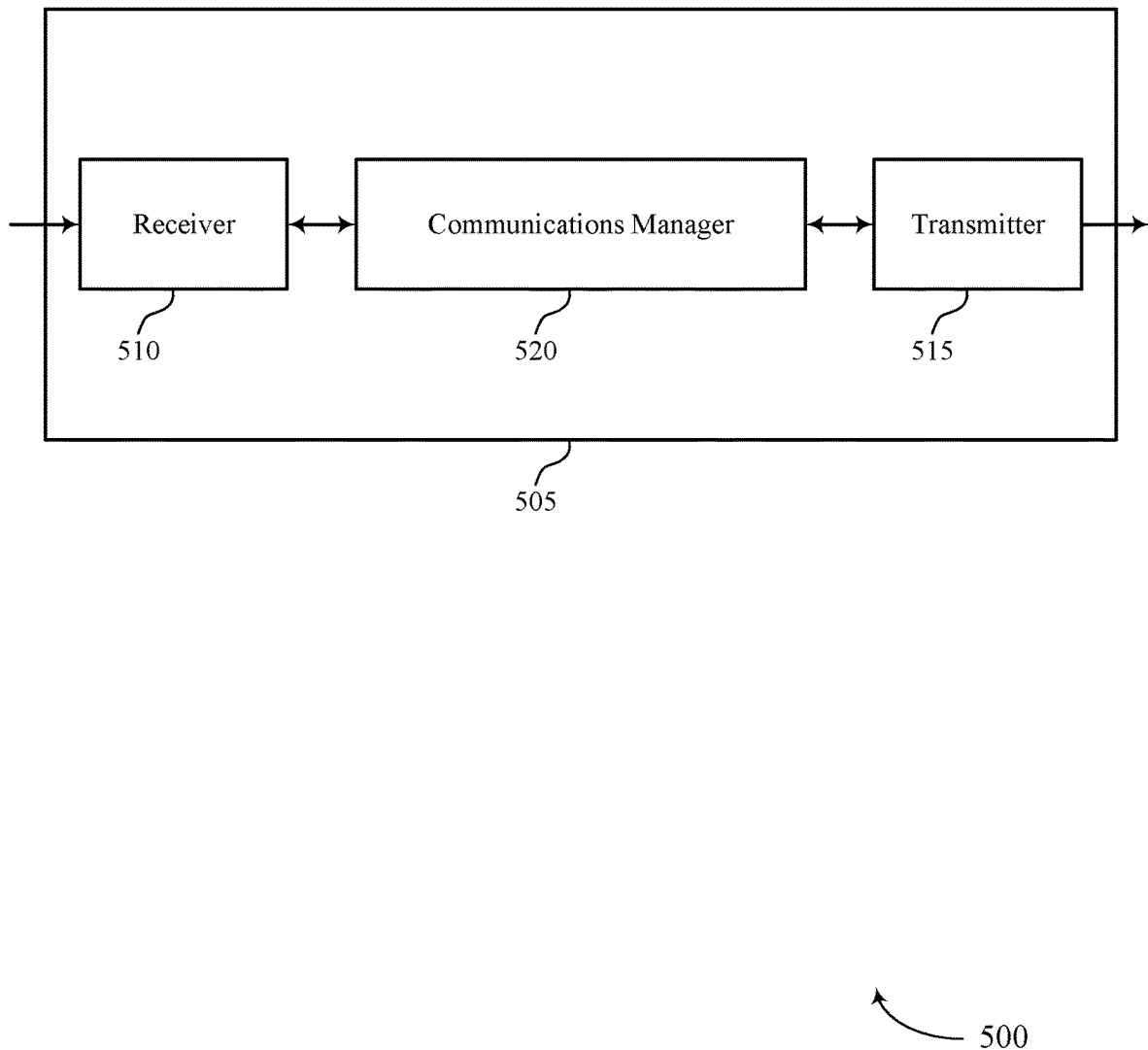
FIGS. 5 and 6 show block diagrams of devices that support prioritization techniques for sidelink CSI reporting in accordance with aspects of the present disclosure.

FIG. 5 shows a block diagram 500 of a device 505 that supports prioritization techniques for sidelink CSI reporting in accordance with aspects of the present disclosure. The device 505 may be an example of aspects of a UE 115 as described herein. The device 505 may include a receiver 510, a transmitter 515, and a communications manager 520. The device 505 may also include at least one processor. Each of these components may be in communication with one another (e.g., via one or more buses).

The receiver 510 may provide a means for receiving information such as packets, user data, control information, or any combination thereof associated with various information channels (e.g., control channels, data channels, information channels related to prioritization techniques for sidelink CSI reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to prioritization techniques for sidelink CSI reporting). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of prioritization techniques for sidelink CSI reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the processor may be configured to perform one or more of the functions described herein (e.g., by executing, by the at least one processor, instructions stored in the memory).

Additionally or alternatively, in some examples, the communications manager 520, the receiver 510, the transmitter 515, or various combinations or components thereof may be implemented in code (e.g., as communications management software) executed by at least one processor. If implemented in code executed by at least one processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a set of multiple requests for sidelink CSI, each request of the set of multiple requests triggering a different CSI report from the UE. The communications manager 520 may be configured as or otherwise support a means for generating one or more CSI reports responsive to the set of multiple requests in accordance with a CPU capability of the UE and a priority of each of the set of multiple requests. The communications manager 520 may be configured as or otherwise support a means for transmitting the one or more CSI reports based on the priority of each of the set of multiple requests.

By including or configuring the communications manager 520 in accordance with examples as described herein, the device 505 (e.g., at least one processor controlling or otherwise coupled to the receiver 510, the transmitter 515, the communications manager 520, or a combination thereof) may support techniques for reduced processing, reduced power consumption, and more efficient utilization of communication resources.

Figure 6:
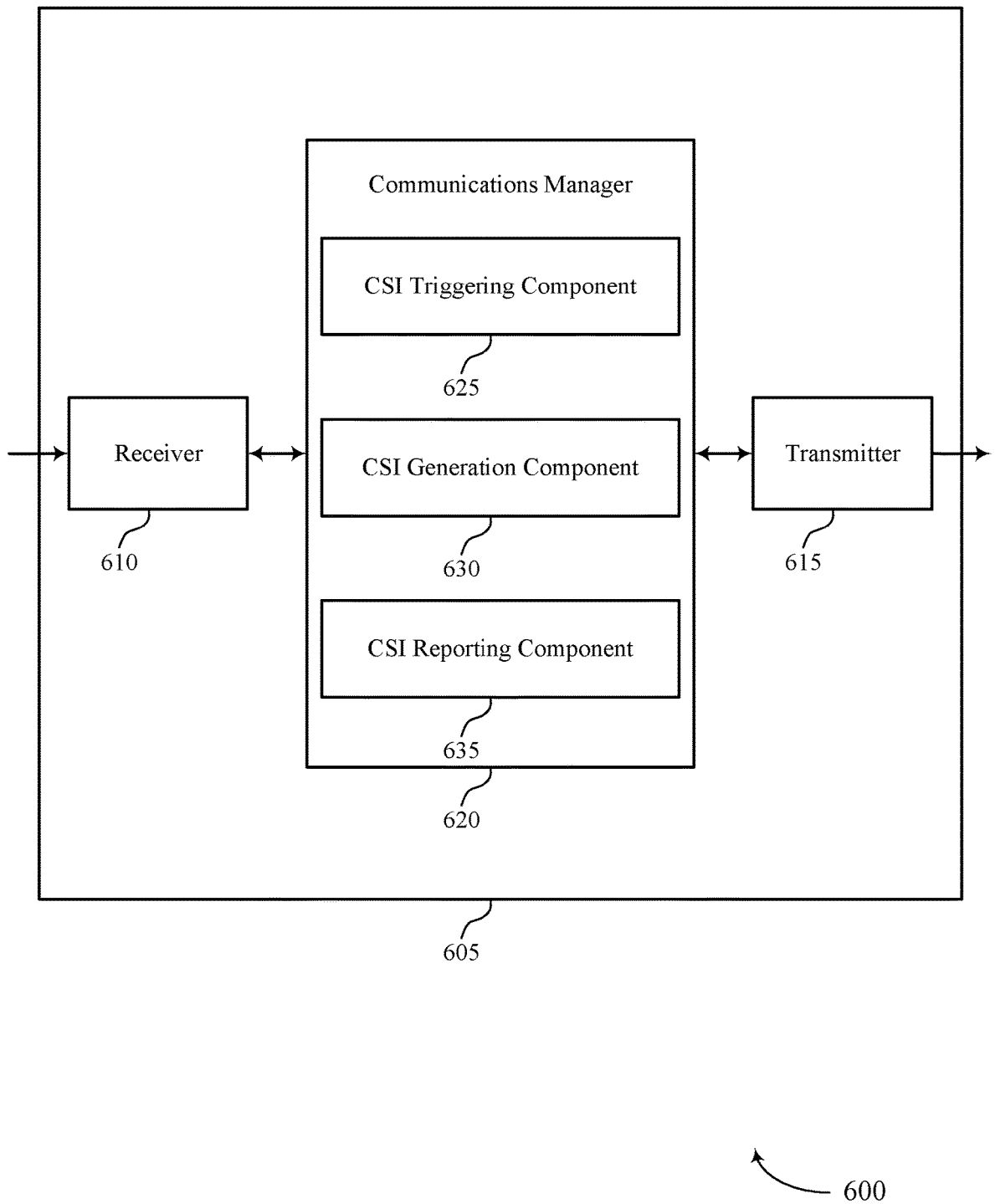

FIG. 6 shows a block diagram 600 of a device 605 that supports prioritization techniques for sidelink CSI reporting in accordance with aspects of the present disclosure. The device 605 may be an example of aspects of a device 505 or a UE 115 as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to prioritization techniques for sidelink CSI reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to prioritization techniques for sidelink CSI reporting). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of prioritization techniques for sidelink CSI reporting as described herein. For example, the communications manager 620 may include a CSI triggering component 625, a CSI generation component 630, a CSI reporting component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The CSI triggering component 625 may be configured as or otherwise support a means for receiving a set of multiple requests for sidelink CSI, each request of the set of multiple requests triggering a different CSI report from the UE. The CSI generation component 630 may be configured as or otherwise support a means for generating one or more CSI reports responsive to the set of multiple requests in accordance with a CPU capability of the UE and a priority of each of the set of multiple requests. The CSI reporting component 635 may be configured as or otherwise support a means for transmitting the one or more CSI reports based on the priority of each of the set of multiple requests.

Figure 7:
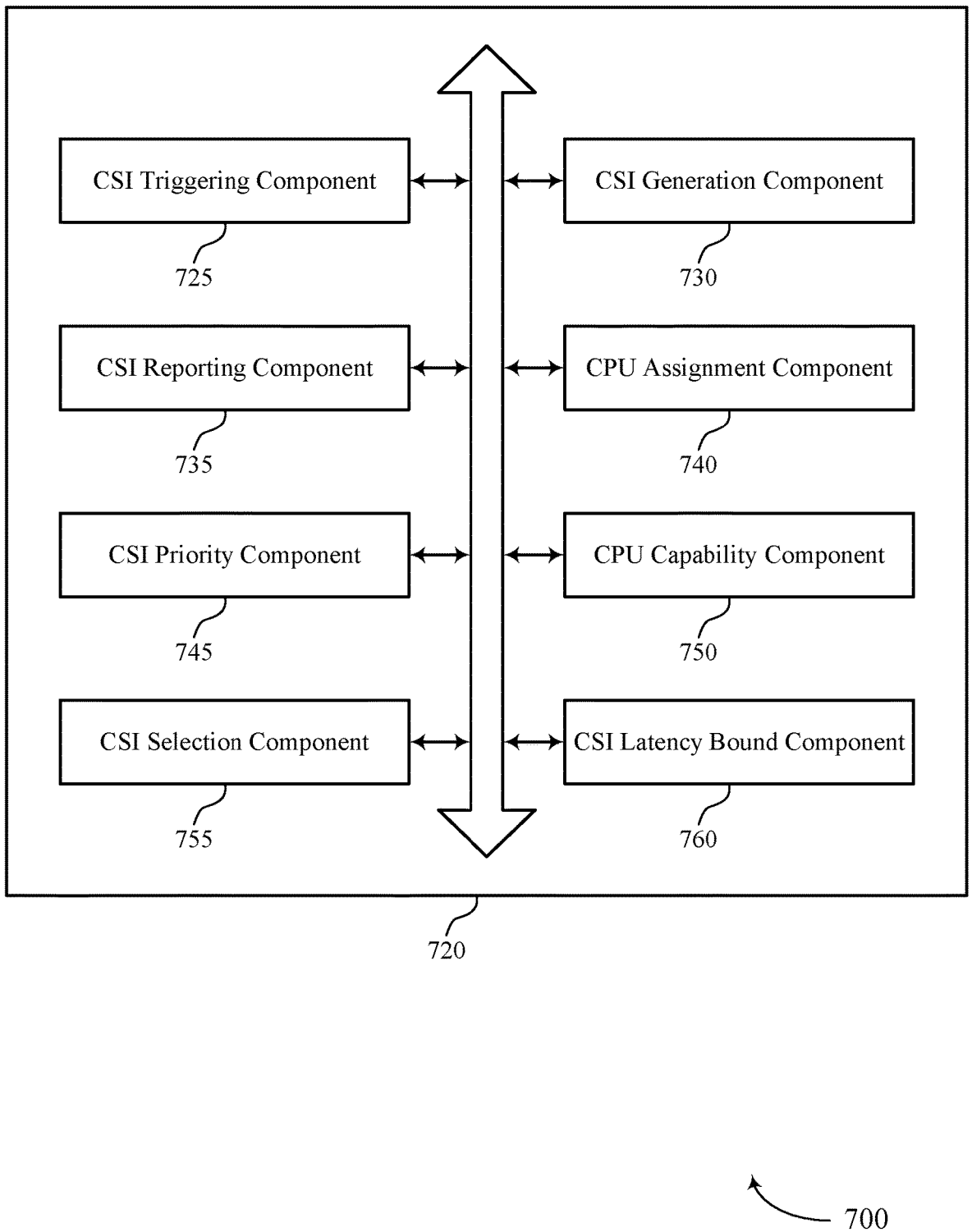
FIG. 7 shows a block diagram of a communications manager that supports prioritization techniques for sidelink CSI reporting in accordance with aspects of the present disclosure.

FIG. 7 shows a block diagram 700 of a communications manager 720 that supports prioritization techniques for sidelink CSI reporting in accordance with aspects of the present disclosure. The communications manager 720 may be an example of aspects of a communications manager 520, a communications manager 620, or both, as described herein. The communications manager 720, or various components thereof, may be an example of means for performing various aspects of prioritization techniques for sidelink CSI reporting as described herein. For example, the communications manager 720 may include a CSI triggering component 725, a CSI generation component 730, a CSI reporting component 735, a CPU assignment component 740, a CSI priority component 745, a CPU capability component 750, a CSI selection component 755, a CSI latency bound component 760, or any combination thereof. Each of these components may communicate, directly or indirectly, with one another (e.g., via one or more buses).

The communications manager 720 may support wireless communication at a UE in accordance with examples as disclosed herein. The CSI triggering component 725 may be configured as or otherwise support a means for receiving a set of multiple requests for sidelink CSI, each request of the set of multiple requests triggering a different CSI report from the UE. The CSI generation component 730 may be configured as or otherwise support a means for generating one or more CSI reports responsive to the set of multiple requests in accordance with a CPU capability of the UE and a priority of each of the set of multiple requests. The CSI reporting component 735 may be configured as or otherwise support a means for transmitting the one or more CSI reports based on the priority of each of the set of multiple requests.

In some examples, the CPU assignment component 740 may be configured as or otherwise support a means for assigning a number of CPUs to each CSI report triggered by the set of multiple requests in accordance with a characteristic of that CSI report, where generating the one or more CSI reports responsive to the set of multiple requests is based on assigning the number of CPUs to each CSI report triggered by the set of multiple requests.

In some examples, the CSI selection component 755 may be configured as or otherwise support a means for selecting the one or more CSI reports based on the number of CPUs assigned to each of the one or more CSI reports and an order in which the set of multiple requests are received, where the priority of each of the set of multiple requests is based on the order in which the set of multiple requests are received, and where the generating is based on the selecting.

In some examples, the one or more CSI reports are triggered by an earliest received one or more requests of the set of multiple requests relative to a remainder of the set of multiple requests.

In some examples, the CSI selection component 755 may be configured as or otherwise support a means for selecting the one or more CSI reports based on the number of CPUs assigned to each of the one or more CSI reports and whether the set of multiple requests are associated with unicast reporting or groupcast reporting, where the priority of each of the set of multiple requests is based on whether that request is associated with the unicast reporting or the groupcast reporting, and where the generating is based on the selecting.

In some examples, the CSI selection component 755 may be configured as or otherwise support a means for selecting the one or more CSI reports based on the number of CPUs assigned to each of the one or more CSI reports and a UE identifier associated with each of the set of multiple requests, where the priority of each of the set of multiple requests is based on the UE identifier associated with each of the set of multiple requests, and where the generating is based on the selecting.

In some examples, the CSI selection component 755 may be configured as or otherwise support a means for selecting the one or more CSI reports based on the number of CPUs assigned to each of the one or more CSI reports and a timer associated with each of the set of multiple requests, where the priority of each of the set of multiple requests is based on the timer associated with each of the set of multiple requests, and where the generating is based on the selecting.

In some examples, the one or more CSI reports are triggered by one or more requests of the set of multiple requests that are associated with timers that are relatively closest to expiry relative to a remainder of the set of multiple requests.

In some examples, the CSI selection component 755 may be configured as or otherwise support a means for selecting the one or more CSI reports based on the number of CPUs assigned to each of the one or more CSI reports, whether the set of multiple requests are associated with wideband reporting or subband reporting, and a number of CSI reference signal ports associated with each of the set of multiple requests, where the priority of each of the set of multiple requests is based on whether that request is associated with the wideband reporting or the subband reporting and the number of CSI reference signal ports associated with that request, and where the generating is based on the selecting.

In some examples, the CSI selection component 755 may be configured as or otherwise support a means for selecting the one or more CSI reports based on the number of CPUs assigned to each of the one or more CSI reports and whether the set of multiple requests are received from a base station or from one or more UEs, where the priority of each of the set of multiple requests is based on whether that request is received from the base station or from the one or more UEs, and where the generating is based on the selecting.

In some examples, the characteristic of a CSI report is based on a number of sidelink CSI reference signal ports associated with the CSI report, whether the CSI report is for wideband reporting or for subband reporting, contents of the CSI report, a number of panels associated with the CSI report, or any combination thereof.

In some examples, the CSI priority component 745 may be configured as or otherwise support a means for receiving an indication of a prioritization rule for the set of multiple requests, where the priority of each of the set of multiple requests is based on the indication of the prioritization rule.

In some examples, the CPU capability component 750 may be configured as or otherwise support a means for transmitting, to a base station or a second UE, control signaling including an indication of the CPU capability of the UE.

In some examples, to support receiving the set of multiple requests for sidelink CSI, the CSI triggering component 725 may be configured as or otherwise support a means for receiving a first request triggering a first CSI report, where the first CSI report is assigned a first number of CPUs and the first request is associated with a first priority. In some examples, to support receiving the set of multiple requests for sidelink CSI, the CSI triggering component 725 may be configured as or otherwise support a means for receiving, after the first request, a second request triggering a second CSI report, where the second CSI report is assigned a second number of CPUs and the second request is associated with a second priority greater than the first priority.

In some examples, the CPU capability component 750 may be configured as or otherwise support a means for determining that generating both the first CSI report and the second CSI report would exceed the CPU capability of the UE based on the first number of CPUs and the second number of CPUs. In some examples, the CSI selection component 755 may be configured as or otherwise support a means for dropping the first CSI report based on the determining and based on the second priority being greater than the first priority. In some examples, the CSI selection component 755 may be configured as or otherwise support a means for selecting the second CSI report for generation based on dropping the first CSI report.

In some examples, the CSI selection component 755 may be configured as or otherwise support a means for deprioritizing a number of CSI reports in accordance with the CPU capability of the UE and the priority of each of the set of multiple requests, where the generated one or more CSI reports exclude the deprioritized number of CSI reports. In some examples, the CSI reporting component 735 may be configured as or otherwise support a means for refraining from transmitting the deprioritized number of CSI reports.

In some examples, the CPU assignment component 740 may be configured as or otherwise support a means for assigning a number of CPUs to each of a first subset of CSI reports triggered by the set of multiple requests in accordance with a characteristic of that CSI report, where generating the one or more CSI reports responsive to the set of multiple requests is based on assigning the number of CPUs to each of the first subset of CSI reports triggered by the set of multiple requests. In some examples, the CSI latency bound component 760 may be configured as or otherwise support a means for starting a timer associated with each of a second subset of CSI reports triggered by the set of multiple requests in accordance with a latency bound parameter.

In some examples, the CSI generation component 730 may be configured as or otherwise support a means for generating a second one or more CSI reports from the second subset of CSI reports in accordance with the timer associated with each of the second subset of CSI reports and a sidelink resource allocation of the UE. In some examples, the CSI reporting component 735 may be configured as or otherwise support a means for transmitting the second one or more CSI reports as a result of the generating.

In some examples, a summation of a number of CPUs assigned to each of the one or more CSI reports is less than or equal to the CPU capability of the UE.

Figure 8:
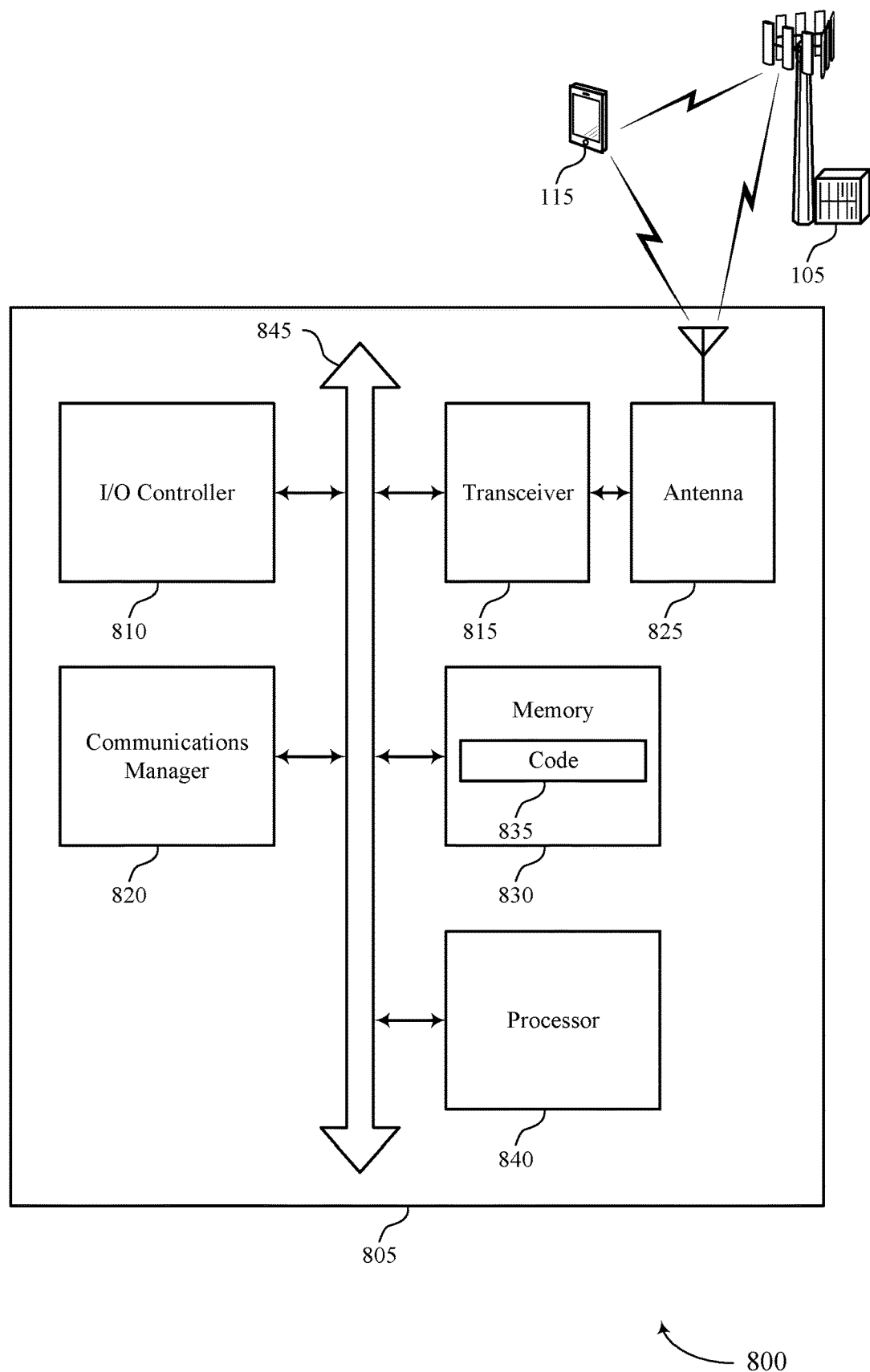
FIG. 8 shows a diagram of a system including a device that supports prioritization techniques for sidelink CSI reporting in accordance with aspects of the present disclosure.

FIG. 8 shows a diagram of a system 800 including a device 805 that supports prioritization techniques for sidelink CSI reporting in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of at least one processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting prioritization techniques for sidelink CSI reporting). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a set of multiple requests for sidelink CSI, each request of the set of multiple requests triggering a different CSI report from the UE. The communications manager 820 may be configured as or otherwise support a means for generating one or more CSI reports responsive to the set of multiple requests in accordance with a CPU capability of the UE and a priority of each of the set of multiple requests. The communications manager 820 may be configured as or otherwise support a means for transmitting the one or more CSI reports based on the priority of each of the set of multiple requests.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of prioritization techniques for sidelink CSI reporting as described herein, or the processor 840 and the memory 830 may be otherwise configured to perform or support such operations.

Figure 9:
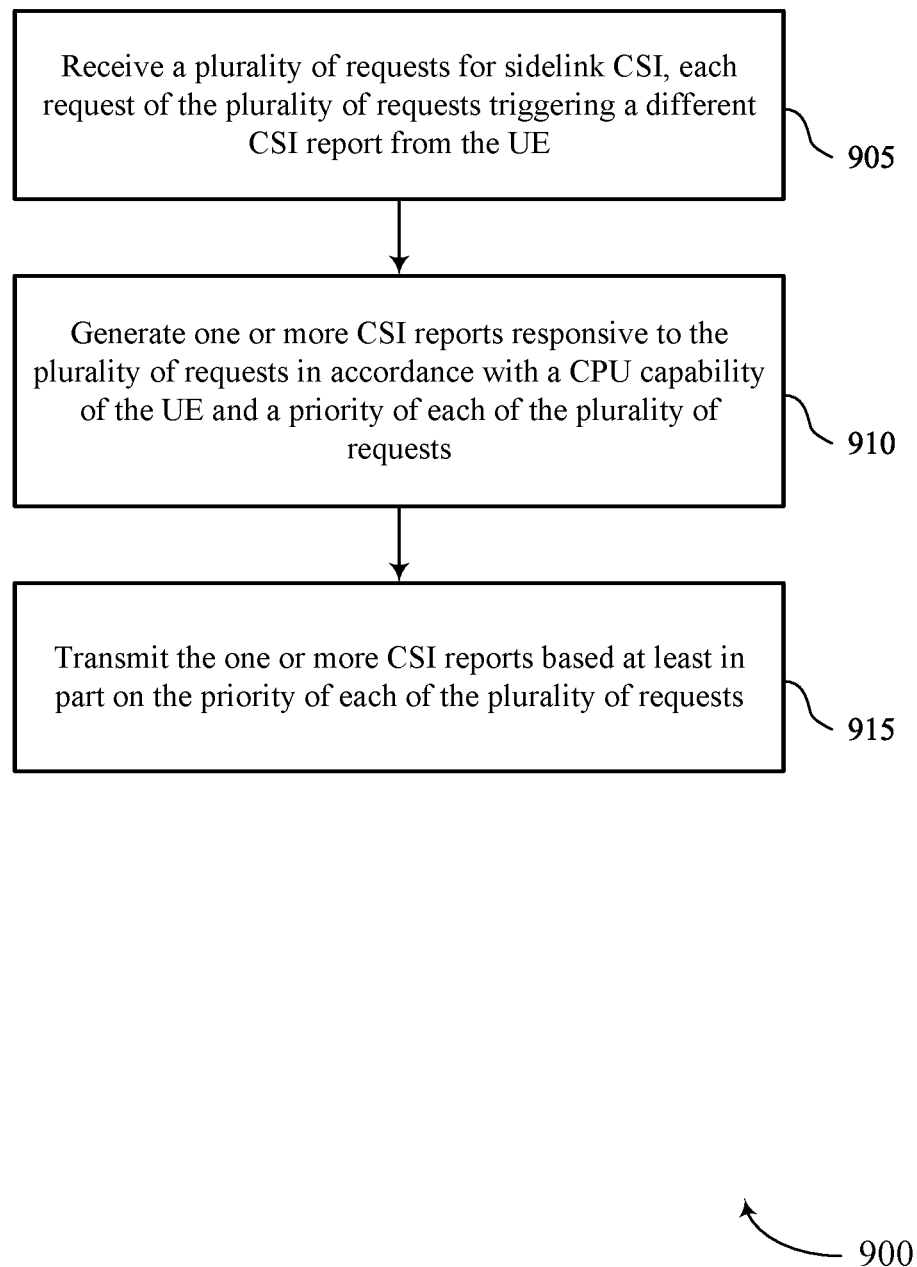
FIGS. 9 through 12 show flowcharts illustrating methods that support prioritization techniques for sidelink CSI reporting in accordance with aspects of the present disclosure.

FIG. 9 shows a flowchart illustrating a method 900 that supports prioritization techniques for sidelink CSI reporting in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a plurality of requests for sidelink CSI, each request of the plurality of requests triggering a different CSI report from the UE. The operations of 905 may be performed in accordance with examples as disclosed herein. In some examples, aspects of the operations of 905 may be performed by a CSI triggering component 725 as described with reference to FIG. 7.

At 910, the method may include generating one or more CSI reports responsive to the plurality of requests in accordance with a CPU capability of the UE and a priority of each of the plurality of requests. The operations of 910 may be performed in accordance with examples as disclosed herein. In some examples, aspects of the operations of 910 may be performed by a CSI generation component 730 as described with reference to FIG. 7.

At 915, the method may include transmitting the one or more CSI reports based at least in part on the priority of each of the plurality of requests. The operations of 915 may be performed in accordance with examples as disclosed herein. In some examples, aspects of the operations of 915 may be performed by a CSI reporting component 735 as described with reference to FIG. 7.

Figure 10:
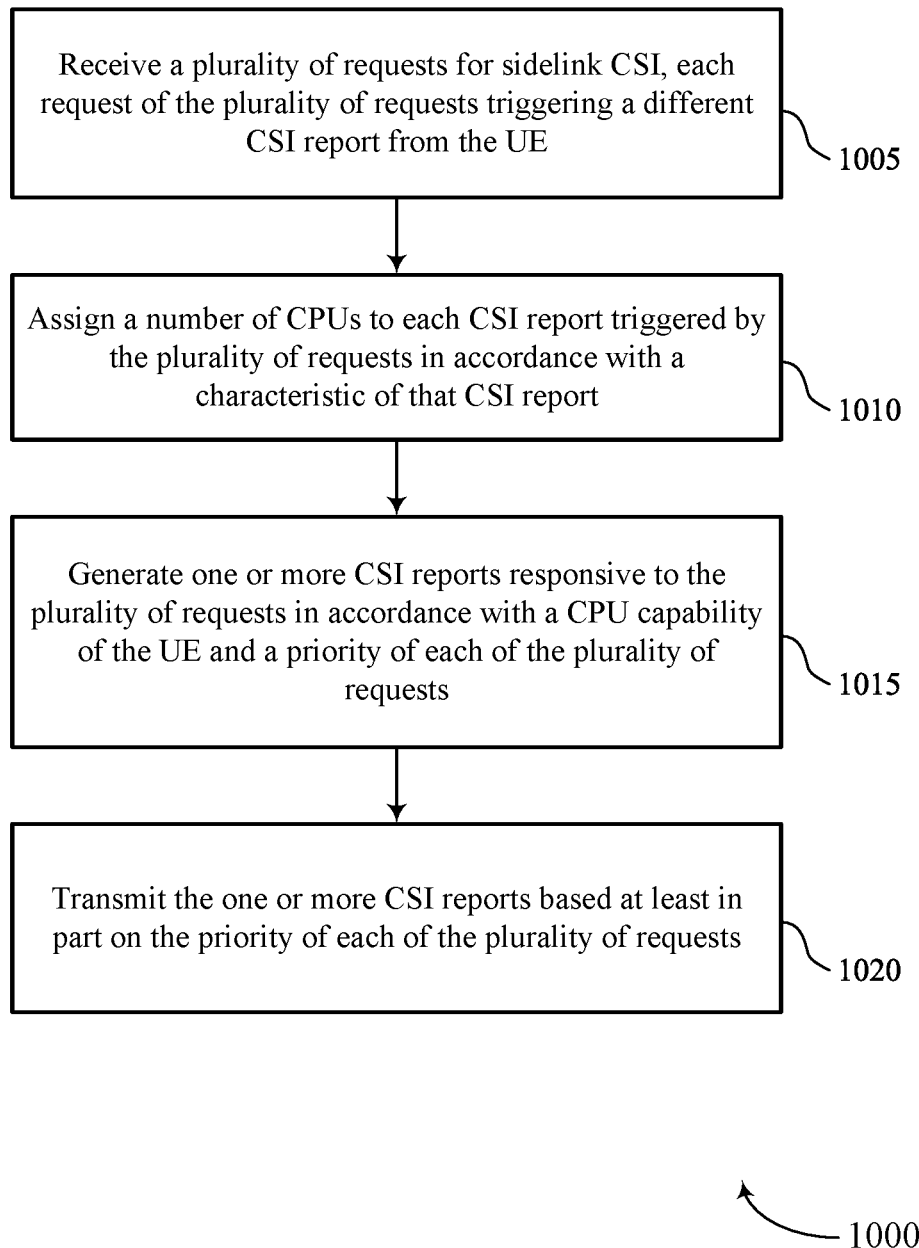

FIG. 10 shows a flowchart illustrating a method 1000 that supports prioritization techniques for sidelink CSI reporting in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a plurality of requests for sidelink CSI, each request of the plurality of requests triggering a different CSI report from the UE. The operations of 1005 may be performed in accordance with examples as disclosed herein. In some examples, aspects of the operations of 1005 may be performed by a CSI triggering component 725 as described with reference to FIG. 7.

At 1010, the method may include assigning a number of CPUs to each CSI report triggered by the plurality of requests in accordance with a characteristic of that CSI report. The operations of 1010 may be performed in accordance with examples as disclosed herein. In some examples, aspects of the operations of 1010 may be performed by a CPU assignment component 740 as described with reference to FIG. 7.

At 1015, the method may include generating one or more CSI reports responsive to the plurality of requests in accordance with a CPU capability of the UE and a priority of each of the plurality of requests. The operations of 1015 may be performed in accordance with examples as disclosed herein. In some examples, aspects of the operations of 1015 may be performed by a CSI generation component 730 as described with reference to FIG. 7.

At 1020, the method may include transmitting the one or more CSI reports based at least in part on the priority of each of the plurality of requests. The operations of 1020 may be performed in accordance with examples as disclosed herein. In some examples, aspects of the operations of 1020 may be performed by a CSI reporting component 735 as described with reference to FIG. 7.

Figure 11:
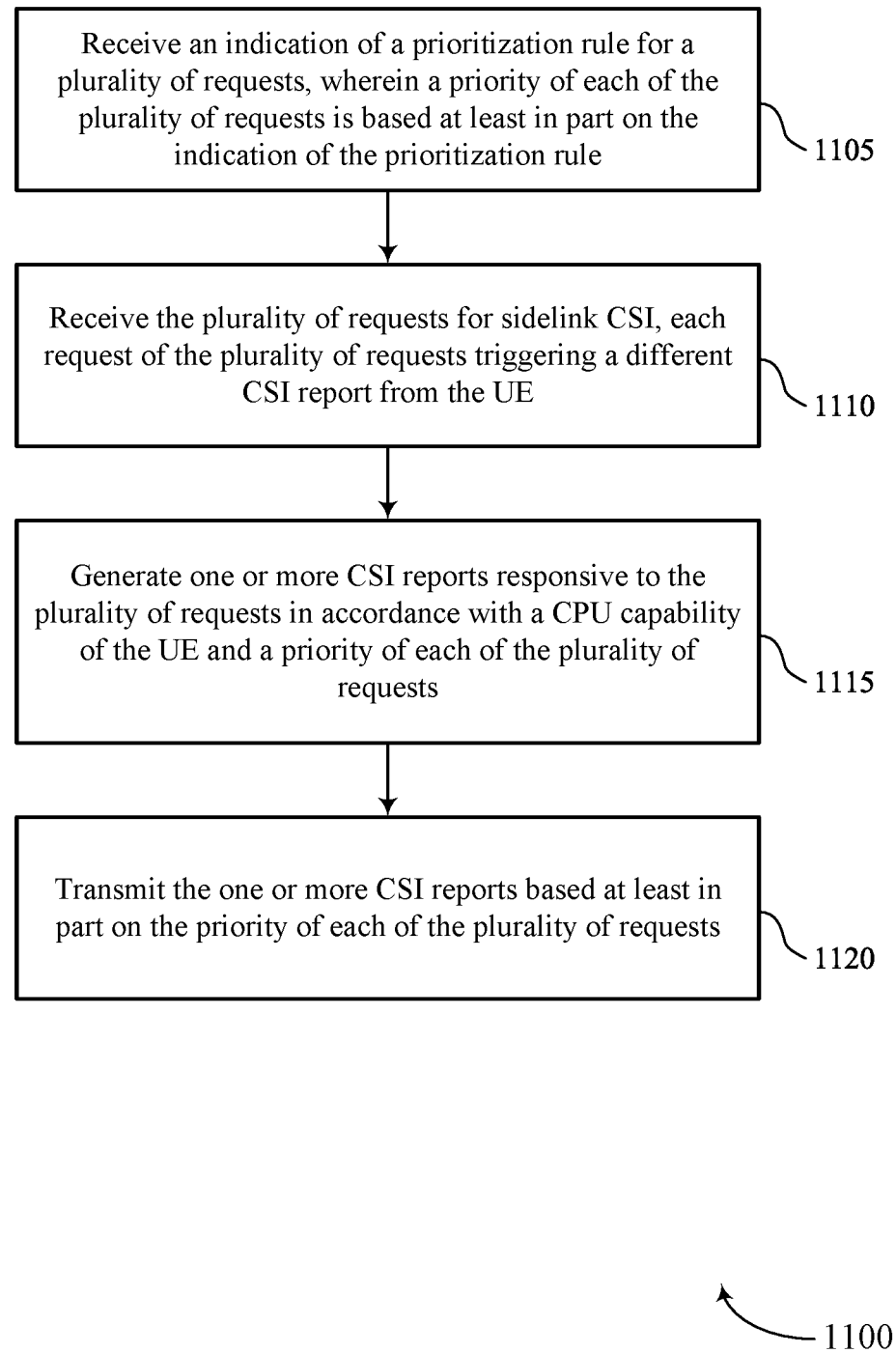

FIG. 11 shows a flowchart illustrating a method 1100 that supports prioritization techniques for sidelink CSI reporting in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving an indication of a prioritization rule for a plurality of requests, where a priority of each of the plurality of requests is based at least in part on the indication of the prioritization rule. The operations of 1105 may be performed in accordance with examples as disclosed herein. In some examples, aspects of the operations of 1105 may be performed by a CSI priority component 745 as described with reference to FIG. 7.

At 1110, the method may include receiving the plurality of requests for sidelink CSI, each request of the plurality of requests triggering a different CSI report from the UE. The operations of 1110 may be performed in accordance with examples as disclosed herein. In some examples, aspects of the operations of 1110 may be performed by a CSI triggering component 725 as described with reference to FIG. 7.

At 1115, the method may include generating one or more CSI reports responsive to the plurality of requests in accordance with a CPU capability of the UE and a priority of each of the plurality of requests. The operations of 1115 may be performed in accordance with examples as disclosed herein. In some examples, aspects of the operations of 1115 may be performed by a CSI generation component 730 as described with reference to FIG. 7.

At 1120, the method may include transmitting the one or more CSI reports based at least in part on the priority of each of the plurality of requests. The operations of 1120 may be performed in accordance with examples as disclosed herein. In some examples, aspects of the operations of 1120 may be performed by a CSI reporting component 735 as described with reference to FIG. 7.

Figure 12:
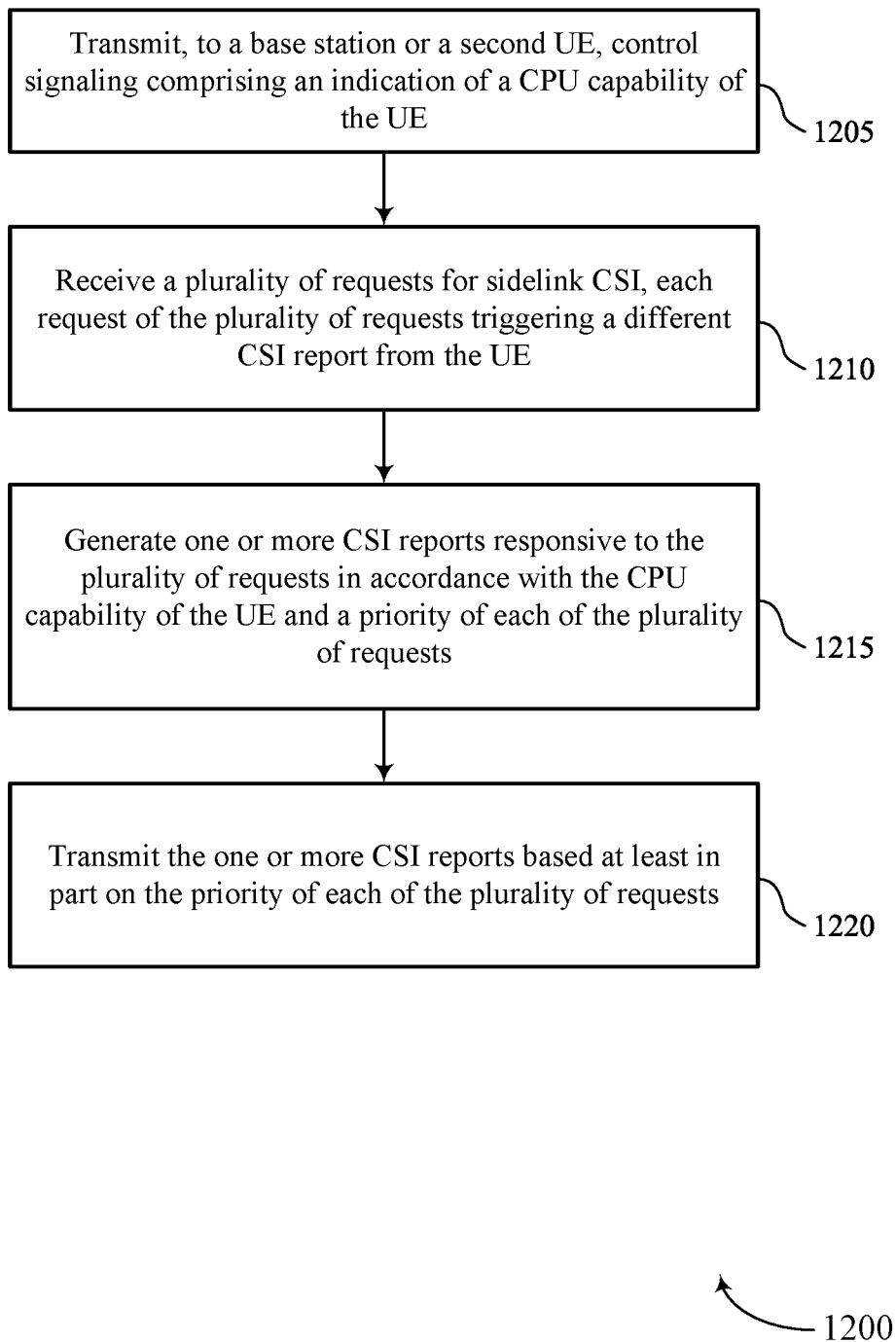

FIG. 12 shows a flowchart illustrating a method 1200 that supports prioritization techniques for sidelink CSI reporting in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include transmitting, to a base station or a second UE, control signaling including an indication of a CPU capability of the UE. The operations of 1205 may be performed in accordance with examples as disclosed herein. In some examples, aspects of the operations of 1205 may be performed by a CPU capability component 750 as described with reference to FIG. 7.

At 1210, the method may include receiving a plurality of requests for sidelink CSI, each request of the plurality of requests triggering a different CSI report from the UE. The operations of 1210 may be performed in accordance with examples as disclosed herein. In some examples, aspects of the operations of 1210 may be performed by a CSI triggering component 725 as described with reference to FIG. 7.

At 1215, the method may include generating one or more CSI reports responsive to the plurality of requests in accordance with the CPU capability of the UE and a priority of each of the plurality of requests. The operations of 1215 may be performed in accordance with examples as disclosed herein. In some examples, aspects of the operations of 1215 may be performed by a CSI generation component 730 as described with reference to FIG. 7.

At 1220, the method may include transmitting the one or more CSI reports based at least in part on the priority of each of the plurality of requests. The operations of 1220 may be performed in accordance with examples as disclosed herein. In some examples, aspects of the operations of 1220 may be performed by a CSI reporting component 735 as described with reference to FIG. 7.

The following provides an overview of aspects of the present disclosure:

Aspect 1: A method for wireless communication at a UE, comprising: receiving a plurality of requests for sidelink CSI, each request of the plurality of requests triggering a different CSI report from the UE; generating one or more CSI reports responsive to the plurality of requests in accordance with a CPU capability of the UE and a priority of each of the plurality of requests; and transmitting the one or more CSI reports based at least in part on the priority of each of the plurality of requests.

Aspect 2: The method of aspect 1, further comprising: assigning a number of CPUs to each CSI report triggered by the plurality of requests in accordance with a characteristic of that CSI report, wherein generating the one or more CSI reports responsive to the plurality of requests is based at least in part on assigning the number of CPUs to each CSI report triggered by the plurality of requests.

Aspect 3: The method of aspect 2, further comprising: selecting the one or more CSI reports based at least in part on the number of CPUs assigned to each of the one or more CSI reports and an order in which the plurality of requests are received, wherein the priority of each of the plurality of requests is based at least in part on the order in which the plurality of requests are received, and wherein the generating is based at least in part on the selecting.

Aspect 4: The method of aspect 3, wherein the one or more CSI reports are triggered by an earliest received one or more requests of the plurality of requests relative to a remainder of the plurality of requests.

Aspect 5: The method of any of aspects 2 through 4, further comprising: selecting the one or more CSI reports based at least in part on the number of CPUs assigned to each of the one or more CSI reports and whether the plurality of requests are associated with unicast reporting or groupcast reporting, wherein the priority of each of the plurality of requests is based at least in part on whether that request is associated with the unicast reporting or the groupcast reporting, and wherein the generating is based at least in part on the selecting.

Aspect 6: The method of any of aspects 2 through 5, further comprising: selecting the one or more CSI reports based at least in part on the number of CPUs assigned to each of the one or more CSI reports and a UE identifier associated with each of the plurality of requests, wherein the priority of each of the plurality of requests is based at least in part on the UE identifier associated with each of the plurality of requests, and wherein the generating is based at least in part on the selecting.

Aspect 7: The method of any of aspects 2 through 6, further comprising: selecting the one or more CSI reports based at least in part on the number of CPUs assigned to each of the one or more CSI reports and a timer associated with each of the plurality of requests, wherein the priority of each of the plurality of requests is based at least in part on the timer associated with each of the plurality of requests, and wherein the generating is based at least in part on the selecting.

Aspect 8: The method of aspect 7, wherein the one or more CSI reports are triggered by one or more requests of the plurality of requests that are associated with timers that are relatively closest to expiry relative to a remainder of the plurality of requests.

Aspect 9: The method of any of aspects 2 through 8, further comprising: selecting the one or more CSI reports based at least in part on the number of CPUs assigned to each of the one or more CSI reports, whether the plurality of requests are associated with wideband reporting or subband reporting, and a number of CSI reference signal ports associated with each of the plurality of requests, wherein the priority of each of the plurality of requests is based at least in part on whether that request is associated with the wideband reporting or the subband reporting and the number of CSI reference signal ports associated with that request, and wherein the generating is based at least in part on the selecting.

Aspect 10: The method of any of aspects 2 through 9, further comprising: selecting the one or more CSI reports based at least in part on the number of CPUs assigned to each of the one or more CSI reports and whether the plurality of requests are received from a base station or from one or more UEs, wherein the priority of each of the plurality of requests is based at least in part on whether that request is received from the base station or from the one or more UEs, and wherein the generating is based at least in part on the selecting.

Aspect 11: The method of any of aspects 2 through 10, wherein the characteristic of a CSI report is based at least in part on a number of sidelink CSI reference signal ports associated with the CSI report, whether the CSI report is for wideband reporting or for subband reporting, contents of the CSI report, a number of panels associated with the CSI report, or any combination thereof.

Aspect 12: The method of any of aspects 1 through 11, further comprising: receiving an indication of a prioritization rule for the plurality of requests, wherein the priority of each of the plurality of requests is based at least in part on the indication of the prioritization rule.

Aspect 13: The method of any of aspects 1 through 12, further comprising: transmitting, to a base station or a second UE, control signaling comprising an indication of the CPU capability of the UE.

Aspect 14: The method of any of aspects 1 through 13, wherein receiving the plurality of requests for sidelink CSI comprises: receiving a first request triggering a first CSI report, wherein the first CSI report is assigned a first number of CPUs and the first request is associated with a first priority; and receiving, after the first request, a second request triggering a second CSI report, wherein the second CSI report is assigned a second number of CPUs and the second request is associated with a second priority greater than the first priority.

Aspect 15: The method of aspect 14, further comprising: determining that generating both the first CSI report and the second CSI report would exceed the CPU capability of the UE based at least in part on the first number of CPUs and the second number of CPUs; dropping the first CSI report based at least in part on the determining and based at least in part on the second priority being greater than the first priority; and selecting the second CSI report for generation based at least in part on dropping the first CSI report.

Aspect 16: The method of any of aspects 1 through 15, further comprising: deprioritizing a number of CSI reports in accordance with the CPU capability of the UE and the priority of each of the plurality of requests, wherein the generated one or more CSI reports exclude the deprioritized number of CSI reports; and refraining from transmitting the deprioritized number of CSI reports.

Aspect 17: The method of aspect 1, further comprising: assigning a number of CPUs to each of a first subset of CSI reports triggered by the plurality of requests in accordance with a characteristic of that CSI report, wherein generating the one or more CSI reports responsive to the plurality of requests is based at least in part on assigning the number of CPUs to each of the first subset of CSI reports triggered by the plurality of requests; and starting a timer associated with each of a second subset of CSI reports triggered by the plurality of requests in accordance with a latency bound parameter.

Aspect 18: The method of aspect 17, further comprising: generating a second one or more CSI reports from the second subset of CSI reports in accordance with the timer associated with each of the second subset of CSI reports and a sidelink resource allocation of the UE; and transmitting the second one or more CSI reports as a result of the generating.

Aspect 19: The method of any of aspects 1 through 18, wherein a summation of a number of CPUs assigned to each of the one or more CSI reports is less than or equal to the CPU capability of the UE.

Aspect 20: An apparatus for wireless communication at a UE, comprising at least one processor; memory coupled with the at least one processor; and instructions stored in the memory and executable by the at least one processor to cause the UE (or the apparatus) to perform a method of any of aspects 1 through 19.

Aspect 21: An apparatus for wireless communication at a UE, comprising at least one means for performing a method of any of aspects 1 through 19.

Aspect 22: A non-transitory computer-readable medium storing code for wireless communication at a UE, the code comprising instructions executable by at least one processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a central processing unit, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information), or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a plurality of requests for sidelink channel state information triggering a plurality of channel state information reports from the UE, each request of the plurality of requests triggering a different channel state information report of the plurality of channel state information reports;
   assigning a respective quantity of channel state information processing units to each channel state information report triggered by the plurality of requests in accordance with a characteristic of that channel state information report, wherein the characteristic of that channel state information report is based at least in part on a quantity of sidelink channel state information reference signal ports associated with that channel state information report, whether that channel state information report is for wideband reporting or for subband reporting, contents of that channel state information report, a quantity of panels associated with that channel state information report, or any combination thereof;
generating one or more channel state information reports responsive to the plurality of requests in accordance with a channel state information processing unit capability of the UE and a priority of each of the plurality of requests, wherein generating the one or more channel state information reports responsive to the plurality of requests is based at least in part on assigning the respective quantity of channel state information processing units to each channel state information report triggered by the plurality of requests; and
transmitting the one or more channel state information reports based at least in part on the priority of each of the plurality of requests.

2. The method of claim 1, further comprising:
selecting the one or more channel state information reports based at least in part on the respective quantity of channel state information processing units assigned to each of the one or more channel state information reports and an order in which the plurality of requests are received, wherein the priority of each of the plurality of requests is based at least in part on the order in which the plurality of requests are received, and wherein the generating is based at least in part on the selecting.

3. The method of claim 2, wherein the one or more channel state information reports are triggered by an earliest received one or more requests of the plurality of requests relative to a remainder of the plurality of requests.

4. The method of claim 1, further comprising:
selecting the one or more channel state information reports based at least in part on the respective quantity of channel state information processing units assigned to each of the one or more channel state information reports and whether the plurality of requests are associated with unicast reporting or groupcast reporting, wherein the priority of each of the plurality of requests is based at least in part on whether that request is associated with the unicast reporting or the groupcast reporting, and wherein the generating is based at least in part on the selecting.

5. The method of claim 1, further comprising:
selecting the one or more channel state information reports based at least in part on the respective quantity of channel state information processing units assigned to each of the one or more channel state information reports and a UE identifier associated with each of the plurality of requests, wherein the priority of each of the plurality of requests is based at least in part on the UE identifier associated with each of the plurality of requests, and wherein the generating is based at least in part on the selecting.

6. The method of claim 1, further comprising:
selecting the one or more channel state information reports based at least in part on the respective quantity of channel state information processing units assigned to each of the one or more channel state information reports and a timer associated with each of the plurality of requests, wherein the priority of each of the plurality of requests is based at least in part on the timer associated with each of the plurality of requests, and wherein the generating is based at least in part on the selecting.

7. The method of claim 6, wherein the one or more channel state information reports are triggered by one or more requests of the plurality of requests that are associated with timers that are relatively closest to expiry relative to a remainder of the plurality of requests.

8. The method of claim 1, further comprising:
selecting the one or more channel state information reports based at least in part on the respective quantity of channel state information processing units assigned to each of the one or more channel state information reports, whether the plurality of requests are associated with the wideband reporting or the subband reporting, and the quantity of channel state information reference signal ports associated with each of the plurality of requests, wherein the priority of each of the plurality of requests is based at least in part on whether that request is associated with the wideband reporting or the subband reporting and the quantity of channel state information reference signal ports associated with that request, and wherein the generating is based at least in part on the selecting.

9. The method of claim 1, further comprising:
selecting the one or more channel state information reports based at least in part on the respective quantity of channel state information processing units assigned to each of the one or more channel state information reports and whether the plurality of requests are received from a base station or from one or more UEs, wherein the priority of each of the plurality of requests is based at least in part on whether that request is received from the base station or from the one or more UEs, and wherein the generating is based at least in part on the selecting.

10. The method of claim 1, further comprising:
receiving an indication of a prioritization rule for the plurality of requests, wherein the priority of each of the plurality of requests is based at least in part on the indication of the prioritization rule.

11. The method of claim 1, further comprising:
transmitting, to a base station or a second UE, control signaling comprising an indication of the channel state information processing unit capability of the UE.

12. The method of claim 1, wherein receiving the plurality of requests for sidelink channel state information comprises:
receiving a first request triggering a first channel state information report, wherein the first channel state information report is assigned a first number quantity of channel state information processing units and the first request is associated with a first priority; and
receiving, after the first request, a second request triggering a second channel state information report, wherein the second channel state information report is assigned a second quantity of channel state information processing units and the second request is associated with a second priority greater than the first priority.

13. The method of claim 12, further comprising:
determining that generating both the first channel state information report and the second channel state information report would exceed the channel state information processing unit capability of the UE based at least in part on the first quantity of channel state information processing units and the second quantity of channel state information processing units;
dropping the first channel state information report based at least in part on the determining and based at least in part on the second priority being greater than the first priority; and selecting the second channel state information report for generation based at least in part on dropping the first channel state information report.

14. The method of claim 1, further comprising:
deprioritizing one or more channel state information reports in accordance with the channel state information processing unit capability of the UE and the priority of each of the plurality of requests, wherein the generated one or more channel state information reports exclude the deprioritized one or more channel state information reports; and
refraining from transmitting the deprioritized one or more channel state information reports.

15. The method of claim 1, further comprising:
receiving one or more second requests for sidelink channel state information triggering one or more second channel state information reports from the UE, each request of the one or more second requests triggering a different channel state information report of the one or more second channel state information reports;
starting a respective timer associated with each channel state information reports triggered by the one or more second requests in accordance with a latency bound parameter;
generating at least one channel state information report of the one or more second channel state information reports in accordance with the respective timer associated with each of the one or more second channel state information reports and a sidelink resource allocation of the UE; and
transmitting the at least one channel state information report as a result of the generating of the at least one channel state information report.

16. An apparatus for wireless communication at a user equipment (UE), comprising:
means for receiving a plurality of requests for sidelink channel state information triggering a plurality of channel state information reports from the UE, each request of the plurality of requests triggering a different channel state information report of the plurality of channel state information reports;
means for assigning a respective quantity of channel state information processing units to each channel state information report triggered by the plurality of requests in accordance with a characteristic of that channel state information report, wherein the characteristic of that channel state information report is based at least in part on a quantity of sidelink channel state information reference signal ports associated with that channel state information report, whether that channel state information report is for wideband reporting or for subband reporting, contents of that channel state information report, a quantity of panels associated with that channel state information report, or any combination thereof;
means for generating one or more channel state information reports responsive to the plurality of requests in accordance with a channel state information processing unit capability of the UE and a priority of each of the plurality of requests, wherein generating the one or more channel state information reports responsive to the plurality of requests is based at least in part on assigning the respective quantity of channel state information processing units to each channel state information report triggered by the plurality of requests; and
means for transmitting the one or more channel state information reports based at least in part on the priority of each of the plurality of requests.

17. A non-transitory computer-readable medium storing code for wireless communication at a user equipment (UE), the code comprising instructions executable by at least one processor to:
receive a plurality of requests for sidelink channel state information triggering a plurality of channel state information reports from the UE, each request of the plurality of requests triggering a different channel state information report of the plurality of channel state information reports;
assign a respective quantity of channel state information processing units to each channel state information report triggered by the plurality of requests in accordance with a characteristic of that channel state information report, wherein the characteristic of that channel state information report is based at least in part on a quantity of sidelink channel state information reference signal ports associated with that channel state information report, whether that channel state information report is for wideband reporting or for subband reporting, contents of that channel state information report, a quantity of panels associated with that channel state information report, or any combination thereof;
generate one or more channel state information reports responsive to the plurality of requests in accordance with a channel state information processing unit capability of the UE and a priority of each of the plurality of requests, wherein generating the one or more channel state information reports responsive to the plurality of requests is based at least in part on assigning the respective quantity of channel state information processing units to each channel state information report triggered by the plurality of requests; and
transmit the one or more channel state information reports based at least in part on the priority of each of the plurality of requests.

18. An apparatus for wireless communication at a user equipment (UE), comprising:
at least one processor; and
memory coupled with the at least one processor, the memory storing instructions executable by the at least one processor to cause the UE to:
receive a plurality of requests for sidelink channel state information triggering a plurality of channel state information reports from the UE, each request of the plurality of requests triggering a different channel state information report of the plurality of channel state information reports;
assign a respective quantity of channel state information processing units to each channel state information report triggered by the plurality of requests in accordance with a characteristic of that channel state information report, wherein the characteristic of that channel state information report is based at least in part on a quantity of sidelink channel state information reference signal ports associated with that channel state information report, whether that channel state information report is for wideband reporting or for subband reporting, contents of that channel state information report, a quantity of panels associated with that channel state information report, or any combination thereof;
generate one or more channel state information reports responsive to the plurality of requests in accordance with a channel state information processing unit capability of the UE and a priority of each of the plurality of requests, wherein generating the one or more channel state information reports responsive to the plurality of requests is based at least in part on assigning the respective quantity of channel state information processing units to each channel state information report triggered by the plurality of requests; and transmit the one or more channel state information reports based at least in part on the priority of each of the plurality of requests.

19. The apparatus of claim 18, wherein the instructions are further executable by the at least one processor to cause the UE to:

select the one or more channel state information reports based at least in part on the respective quantity of channel state information processing units assigned to each of the one or more channel state information reports and an order in which the plurality of requests are received, wherein the priority of each of the plurality of requests is based at least in part on the order in which the plurality of requests are received, and wherein the generating is based at least in part on the selecting.

20. The apparatus of claim 18, wherein the instructions are further executable by the at least one processor to cause the UE to:

select the one or more channel state information reports based at least in part on the respective quantity of channel state information processing units assigned to each of the one or more channel state information reports and whether the plurality of requests are associated with unicast reporting or groupcast reporting, wherein the priority of each of the plurality of requests is based at least in part on whether that request is associated with the unicast reporting or the groupcast reporting, and wherein the generating is based at least in part on the selecting.

21. The apparatus of claim 18, wherein the instructions are further executable by the at least one processor to cause the UE to:

select the one or more channel state information reports based at least in part on the respective quantity of channel state information processing units assigned to each of the one or more channel state information reports and a UE identifier associated with each of the plurality of requests, wherein the priority of each of the plurality of requests is based at least in part on the UE identifier associated with each of the plurality of requests, and wherein the generating is based at least in part on the selecting.

22. The apparatus of claim 18, wherein the instructions are further executable by the at least one processor to cause the UE to:

select the one or more channel state information reports based at least in part on the respective quantity of channel state information processing units assigned to each of the one or more channel state information reports and a timer associated with each of the plurality of requests, wherein the priority of each of the plurality of requests is based at least in part on the timer associated with each of the plurality of requests, and wherein the generating is based at least in part on the selecting.

23. The apparatus of claim 18, wherein the instructions are further executable by the at least one processor to cause the UE to:

select the one or more channel state information reports based at least in part on the respective quantity of channel state information processing units assigned to each of the one or more channel state information reports, whether the plurality of requests are associated with the wideband reporting or the subband reporting, and the quantity of channel state information reference signal ports associated with each of the plurality of requests, wherein the priority of each of the plurality of requests is based at least in part on whether that request is associated with the wideband reporting or the subband reporting and the quantity of channel state information reference signal ports associated with that request, and wherein the generating is based at least in part on the selecting.

24. The apparatus of claim 18, wherein the instructions are further executable by the at least one processor to cause the UE to:

select the one or more channel state information reports based at least in part on the respective quantity of channel state information processing units assigned to each of the one or more channel state information reports and whether the plurality of requests are received from a base station or from one or more UEs, wherein the priority of each of the plurality of requests is based at least in part on whether that request is received from the base station or from the one or more UEs, and wherein the generating is based at least in part on the selecting.

25. The apparatus of claim 18, wherein the instructions are further executable by the at least one processor to cause the UE to:

receive an indication of a prioritization rule for the plurality of requests, wherein the priority of each of the plurality of requests is based at least in part on the indication of the prioritization rule.

26. The apparatus of claim 18, wherein the instructions are further executable by the at least one processor to cause the UE to:

transmit, to a base station or a second UE, control signaling comprising an indication of the channel state information processing unit capability of the UE.

\* \* \* \* \*